(12) United States Patent
Matsuda et al.

(10) Patent No.: US 12,359,602 B2
(45) Date of Patent: Jul. 15, 2025

(54) SOx CONCENTRATION ACQUIRING APPARATUS OF INTERNAL COMBUSTION ENGINE

(71) Applicant: TOYOTA JIDOSHA KABUSHIKI KAISHA, Toyota (JP)

(72) Inventors: Kazuhisa Matsuda, Atsugi (JP); Kazuhiro Wakao, Susono (JP); Keiichiro Aoki, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 952 days.

(21) Appl. No.: 17/450,277

(22) Filed: Oct. 7, 2021

(65) Prior Publication Data
US 2022/0025807 A1    Jan. 27, 2022

Related U.S. Application Data

(62) Division of application No. 16/152,634, filed on Oct. 5, 2018, now abandoned.

(30) Foreign Application Priority Data

Dec. 14, 2017   (JP) .................................. 2017-239460

(51) Int. Cl.
*G01N 27/406*       (2006.01)
*F01N 11/00*        (2006.01)
(Continued)

(52) U.S. Cl.
CPC ............ *F01N 11/00* (2013.01); *F01N 13/008* (2013.01); *G01N 27/4065* (2013.01);
(Continued)

(58) Field of Classification Search
CPC ...... G01N 27/409; G01N 27/41; G01N 27/48; G01N 27/49; G01N 27/406–4065;
(Continued)

(56) References Cited

U.S. PATENT DOCUMENTS

2006/0236677 A1   10/2006  Inagaki
2009/0320451 A1   12/2009  Otsuki
2013/0075256 A1   3/2013   Saitou
2015/0355136 A1*  12/2015  Kato .................. G01N 33/0042
                                              204/406

(Continued)

FOREIGN PATENT DOCUMENTS

CN    106030083 A    10/2016
JP    2003-149199    5/2003
(Continued)

OTHER PUBLICATIONS

Office Action issued in U.S. Appl. No. 16/152,540 on Oct. 30, 2020.

*Primary Examiner* — James Lin
*Assistant Examiner* — Vivian A Tran
(74) *Attorney, Agent, or Firm* — Oblon, McClelland, Maier & Neustadt, L.L.P.

(57) ABSTRACT

A SOx concentration acquiring apparatus of an internal combustion engine of the invention acquires sensor currents as SOx concentration currents after a sensor voltage reaches an oxygen decreasing voltage in a reoxidation voltage decreasing control, acquires the sensor current as a base current when the sensor voltage is equal to or lower than the oxygen decreasing voltage in the reoxidation voltage decreasing control, acquires an integration value of differences between the base current and each of the SOx concentration currents, and acquires a SOx concentration of an exhaust gas discharged from an internal combustion engine on the basis of the integration value.

10 Claims, 24 Drawing Sheets

(51) Int. Cl.
  *F01N 13/00* (2010.01)
  *G01N 27/409* (2006.01)
  *G01N 27/41* (2006.01)
  *G01N 27/419* (2006.01)
  *G01N 27/48* (2006.01)

(52) U.S. Cl.
  CPC ........... *G01N 27/409* (2013.01); *G01N 27/41* (2013.01); *G01N 27/419* (2013.01); *G01N 27/48* (2013.01); *F01N 2560/025* (2013.01); *F01N 2560/026* (2013.01); *F01N 2560/027* (2013.01)

(58) Field of Classification Search
  CPC ... G01N 27/407–4074; G01N 27/4077; G01N 27/417; G01N 27/419; F01N 11/00; F01N 2560/025; F01N 2560/026; F01N 2560/027; F01N 13/008
  See application file for complete search history.

(56) References Cited

U.S. PATENT DOCUMENTS

| | | |
|---|---|---|
| 2016/0061769 A1 | 3/2016 | Hashida |
| 2016/0061771 A1 | 3/2016 | Mizutani |
| 2016/0146085 A1* | 5/2016 | Mizutani ................. F01N 11/00 60/276 |
| 2016/0208721 A1* | 7/2016 | Wakimoto .......... F02D 41/1456 |
| 2016/0209353 A1 | 7/2016 | Aoki |
| 2016/0349206 A1 | 12/2016 | Hashida |
| 2017/0009695 A1 | 1/2017 | Hashida |
| 2017/0292433 A1 | 10/2017 | Hayashita |
| 2018/0149631 A1 | 5/2018 | Aoki |
| 2019/0186325 A1 | 6/2019 | Matsuda |

FOREIGN PATENT DOCUMENTS

| | | | |
|---|---|---|---|
| JP | 2003149199 A | * | 5/2003 |
| JP | 2014-142199 A | | 8/2014 |
| JP | 2015-17931 | | 1/2015 |
| JP | 2015-36538 A | | 2/2015 |
| JP | 2017-190678 A | | 10/2017 |
| JP | 2018-91661 | | 6/2018 |
| WO | 2015/022568 A1 | | 2/2015 |

* cited by examiner

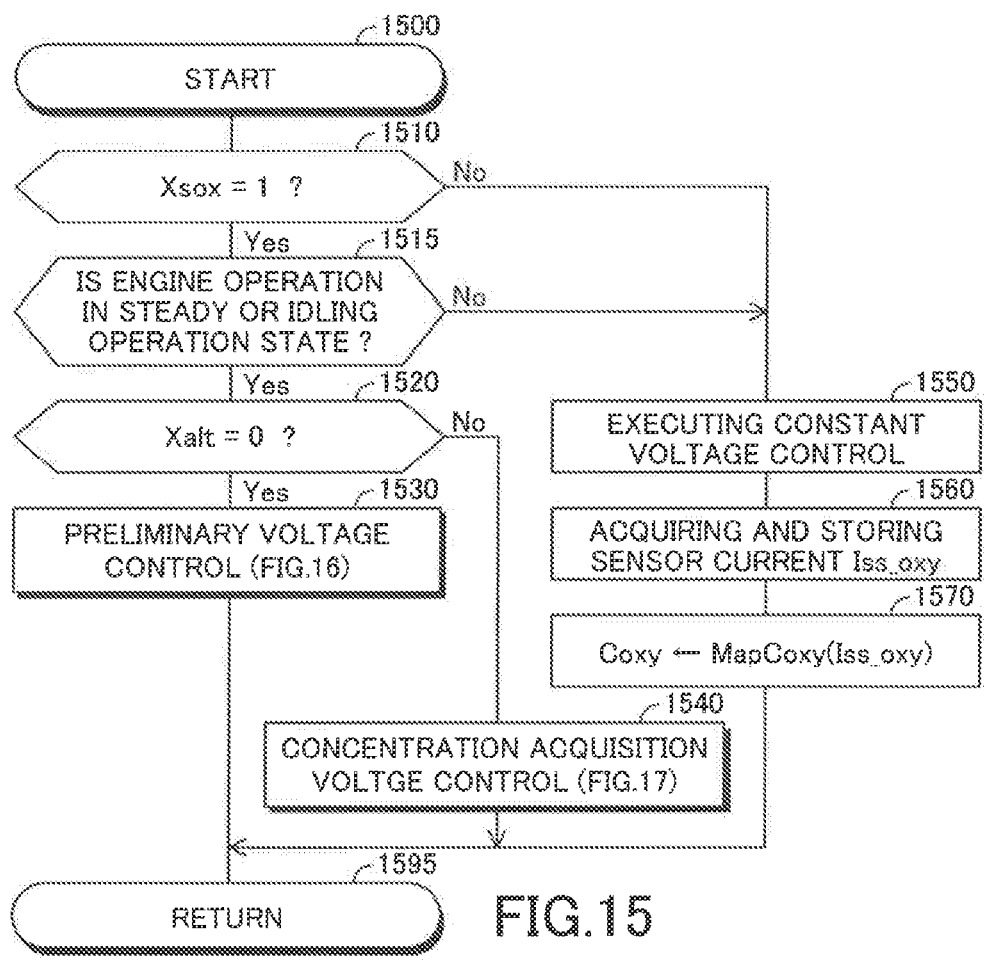

SOx CONCENTRATION ACQUIRING APPARATUS OF INTERNAL COMBUSTION ENGINE

CROSS-REFERENCE TO RELATED APPLICATIONS

This application is a division of U.S. application Ser. No. 16/152,634 filed Oct. 5, 2018, the entire contents of which is incorporated herein by reference. U.S. application Ser. No. 16/152,634 claims the benefit of priority from prior Japanese Application No. 2017-239640 filed Dec. 14, 2017.

BACKGROUND

Field

The invention relates to a SOx concentration acquiring apparatus of an internal combustion engine.

Description of the Related Art

There is known a SOx concentration acquiring apparatus for acquiring a concentration of sulfur oxide included in an exhaust gas discharged from an internal combustion engine (for example, see JP 2015-17931 A). The known SOx concentration acquiring apparatus (hereinafter, will be referred to as "the known apparatus") comprises a limiting current sensor. The limiting current sensor includes solid electrolyte layers, a first sensor electrode, and a second sensor electrode. The first and second sensor electrodes are provided such that one of the solid electrolyte layers is positioned between the first and second sensor electrodes. Further, the first sensor electrode is provided such that the first sensor electrode exposes to the exhaust gas discharged from the internal combustion engine. Hereinafter, the concentration of the sulfur oxide will be referred to as "the SOx concentration", and the concentration of the sulfur oxide included in the exhaust gas just discharged from the internal combustion engine will be referred to as "the exhaust SOx concentration".

The known apparatus increases a voltage applied to the second sensor electrode so as to produce an electric potential difference with respect to the first sensor electrode and then, decreases the voltage.

The known apparatus acquires the exhaust SOx concentration on the basis of a current flowing between the first and second sensor electrodes while the known apparatus decreases the voltage. Hereinafter, the voltage applied to the second sensor electrode will be referred to as "the sensor voltage", and the current flowing between the first and second sensor electrodes will be referred to as "the sensor current".

The known apparatus is configured to acquire the exhaust SOx concentration on the basis of a knowledge that the sensor current correlates with the exhaust SOx concentration while the sensor voltage decreases after the sensor voltage increases. According to this knowledge, the known apparatus acquires, as a SOx concentration current, the sensor current at a point of time that the sensor voltage reaches a certain voltage while the known apparatus decreases the sensor voltage and acquires the exhaust SOx concentration on the basis of the acquired SOx concentration current.

In this regard, the exhaust SOx concentration can be acquired accurately by using a parameter which changes at a rate larger than a rate, at which the SOx concentration current changes when the exhaust SOx concentration changes.

SUMMARY

The invention has been made for solving the above-mentioned problems. An object of the invention is to provide a SOx concentration acquiring apparatus of the internal combustion engine which can acquire the exhaust SOx concentration accurately on the basis of the parameter which changes at a large rate in response to a change of the exhaust SOx concentration.

A SOx concentration acquiring apparatus of an internal combustion engine (50) according to the first invention comprises a sensor cell (15, 26) and an electronic control unit (90). The sensor cell (15, 26) is formed by a solid electrolyte layer (11, 21A), a first sensor electrode (15A, 26A), and a second sensor electrode (15B, 26B). The first sensor electrode (15A, 26A) is provided on one of opposite surfaces of the solid electrolyte layer (11, 21A) such that the first sensor electrode (15A, 26A) exposes to an exhaust gas discharged from the internal combustion engine (50). The second sensor electrode (15B, 26B) is provided on the other surface of the solid electrolyte layer (11, 21A).

The electronic control unit (90) controls a sensor voltage (Vss) which is a voltage applied to the sensor cell (15, 26) and acquires a sensor current (Iss) which is a current flowing through the sensor cell (15, 26).

The electronic control unit (90) is configured to execute a decomposition voltage increasing control for increasing the sensor voltage (Vss) from a first voltage lower than an oxygen increasing voltage (Vox_in) to a second voltage (Vup_end) equal to or higher than the oxygen increasing voltage (see a step 920 in FIG. 9 and a step 1710 in FIG. 17). The oxygen increasing voltage (Vox_in) is a voltage, at which an amount of oxygen component produced by SOx decomposing to sulfur component and the oxygen component is larger than the amount of the oxygen component consumed by the sulfur component being oxidized by the oxygen component to the SOx. The electronic control unit (90) is further configured to execute a reoxidation voltage decreasing control for decreasing the sensor voltage (Vss) from the second voltage (Vup_end) to a third voltage (Vd-own_end) lower than an oxygen decreasing voltage (Vox_de) after the electronic control unit (90) executes the decomposition voltage increasing control (see a step 940 in FIG. 9 and a step 1730 in FIG. 17). The oxygen decreasing voltage (Vox_de) is a voltage, at which the amount of the oxygen component consumed by the sulfur component being oxidized by the oxygen component to the SOx is larger than the amount of the oxygen component produced by the SOx decomposing to the sulfur component and the oxygen component. The electronic control unit (90) is further configured to acquire the sensor currents (Iss) as SOx concentration currents (Iss_sox), respectively after the sensor voltage (Vss) reaches the oxygen decreasing voltage (Vox_de) while the electronic control unit (90) executes the reoxidation voltage decreasing control (see a step 945 in FIG. 9). The electronic control unit (90) is further configured to acquire the sensor current (Iss) as a base current (Ibase) when the sensor voltage (Vss) is equal to or lower than the oxygen decreasing voltage (Vox_de) while the electronic control unit (90) executes the reoxidation voltage decreasing control (see a step 1010 in FIG. 10). The electronic control unit (90) is further configured to acquire an integration value (S11, S12) of differences (dIss) between the base current (Ibase) and each of the SOx concentration currents (Iss_sox) (see a step 1030 in FIG. 10). The electronic control unit (90) is further configured to acquire a SOx concentration (Csox) of the exhaust gas on the basis of the integration value (S11, S12) (see a step 1040 in FIG. 10).

The inventors of this application have a knowledge that the sensor current acquired when the exhaust gas includes the SOx, is lower than the sensor current acquired when the exhaust gas includes no SOx after the sensor voltage reaches the oxygen decreasing voltage while the reoxidation voltage decreasing control is executed. Thus, the inventors have a knowledge that there is a difference between the sensor current acquired when the exhaust gas includes the SOx and the sensor current acquired when the exhaust gas include no SOx after the sensor voltage reaches the oxygen decreasing voltage while the reoxidation voltage decreasing control is executed. The inventors of this application have understood reasons for the difference as follows.

When the exhaust gas includes the SOx, the SOx decomposes to the sulfur component and the oxygen component at the first sensor electrode after the sensor voltage reaches the oxygen increasing voltage while the decomposition voltage increasing control for increasing the sensor voltage is executed. The sulfur component produced by the decomposition of the SOx adheres to the first sensor electrode.

After the sensor voltage reaches the oxygen decreasing voltage while the reoxidation voltage decreasing control for decreasing the sensor voltage, the sulfur component adhering to the first sensor electrode is reoxidized by the oxygen component around the first sensor electrode, thereby returning to the SOx. While the sulfur component is oxidized to the SOx, the SOx may decompose to the sulfur component and the oxygen component at the first sensor electrode. However, the oxidizing reaction of the sulfur component adhering to the first sensor electrode is dominant, compared with the decomposing reaction of the SOx. As a result, the amount of the oxygen component consumed by the oxidation of the sulfur component is larger than the amount of the oxygen component produced by the decomposition of the SOx. Thus, an amount of oxygen ion flowing through the sensor cell decreases. As a result, the sensor current decreases.

For the reasons, the inventors of this application have understood that the sensor current acquired when the exhaust gas includes the SOx is lower than the sensor current acquired when the exhaust gas includes no SOx after the sensor voltage reaches the oxygen decreasing voltage while the reoxidation voltage decreasing control is executed.

The SOx concentration acquiring apparatus according to the first invention acquires the SOx concentration by using the SOx concentration currents acquired after the sensor voltage reaches the oxygen decreasing voltage. The SOx concentration currents are the sensor currents acquired when the amount of the oxygen component consumed by the oxidation of the sulfur component to the SOx, is larger than the amount of the oxygen component produced by the decomposition of the SOx to the sulfur component and the oxygen component. Therefore, the SOx concentration currents are the sensor currents subject to the oxidizing reaction of the sulfur component. Further, the SOx concentration acquiring apparatus acquires the SOx concentration by using the base current acquired when the sensor voltage is equal to or lower than the oxygen decreasing voltage. Therefore, the base current also corresponds to the sensor current subject to the oxidizing reaction of the sulfur component.

Further, the SOx concentration acquiring apparatus according to the first invention uses the integration value for acquiring the SOx concentration. The integration value is a value acquired by integrating the differences between the base current subject to the oxidizing reaction of the sulfur component and each of the SOx concentration currents subject to the oxidizing reaction of the sulfur component. Therefore, the integration value includes almost no component of the sensor current not subject to the oxidizing reaction of the sulfur component.

In addition, the integration value is acquired by using the SOx concentration currents.

In summary, (1) the base current and the SOx concentration currents used for acquiring the integration value by the SOx concentration apparatus according to the first invention, are the sensor currents subject to the oxidizing reaction of the sulfur component derived from the SOx, (2) the differences between the base current and each of the SOx concentration currents used for acquiring the integration value by the SOx concentration acquiring apparatus according to the first invention, are values which include almost no component of the sensor current not subject to the oxidizing reaction of the sulfur component, and (3) the integration value is a value acquired by using the SOx concentration currents by the SOx concentration acquiring apparatus according to the first invention.

Therefore, when the SOx concentration changes, a proportion of change of the integration value is larger than a proportion of change of a difference between the base current not subject to the oxidizing reaction of the sulfur component derived from the SOx and the SOx concentration current. Thus, the integration value represents the change of the SOx concentration explicitly. The SOx concentration acquiring apparatus according to the first invention acquires the SOx concentration by using such an integration value. Thus, the SOx concentration acquiring apparatus can acquire the SOx concentration accurately.

According to an aspect of the first invention, the electronic control unit (90) may be further configured to set, as the third voltage (Vdown_end), the sensor voltage (Vss), at which all the sulfur component is expected to be reoxidized while the electronic control unit (90) executes the reoxidation voltage decreasing control.

When the sensor voltage, at which all of the sulfur component is expected to be oxidized, is set as the third voltage, the SOx concentration acquiring apparatus according to this aspect can acquire the sensor currents subject to the oxidizing reaction of the sulfur component in a wide range of the sensor voltage. Thereby, the change of the integration value is large when the SOx concentration changes. Thus, the SOx concentration acquiring apparatus can acquire the SOx concentration accurately.

According to another aspect of the first invention, the electronic control unit (90) may be further configured to execute a constant voltage control for controlling the sensor voltage (Vss) to a voltage lower than the oxygen increasing voltage (Vox_in) before the electronic control unit (90) executes the decomposition voltage increasing control after the electronic control unit (90) executes the reoxidation voltage decreasing control (see a step 980 in FIG. 9 and a step 1550 in FIG. 15). In this case, the electronic control unit (90) may be further configured to acquire an oxygen concentration (Coxy) of the exhaust gas on the basis of the sensor current (Iss_oxy) acquired while the electronic control unit (90) executes the constant voltage control (see steps 985 and 990 in FIG. 9 and steps 1560 and 1570 in FIG. 15). Thereby, the SOx concentration acquiring apparatus according to this aspect can acquire the oxygen concentration of the exhaust gas as well as the SOx concentration of the exhaust gas.

According to further another aspect of the first invention, the SOx concentration acquiring apparatus may comprise the solid electrolyte layer (21A) as a first solid electrolyte layer. In this case, the SOx concentration acquiring apparatus may further comprise a pump cell (25). The pump cell (25) may be formed by a second solid electrolyte layer (21B), a first pump electrode (25A), and a second pump electrode (25B). The first pump electrode (25A) may be provided on one of opposite surfaces of the second solid electrolyte layer (21B) such that the first pump electrode (25A) exposes to the exhaust gas. The second pump electrode (25B) may be provided on the other surface of the second solid electrolyte layer (21B). In this case, the electronic control unit (90) may be further configured to execute a pump voltage control for applying a voltage (Vpp) capable of decreasing an oxygen concentration of the exhaust gas to generally zero to the pump cell (25) and a constant voltage control for controlling the sensor voltage (Vss) to a constant voltage lower than the oxygen increasing voltage (Vox_in) (see a step 2480 in FIG. 24). The electronic control unit (90) may be further configured to acquire a NOx concentration (Cnox) of the exhaust gas on the basis of the sensor current (Iss_nox) acquired while the electronic control unit (90) executes the pump voltage control and the constant voltage control (see steps 2485 and 2487 in FIG. 24). Thereby, the SOx concentration acquiring apparatus according to this aspect can acquire the NOx concentration of the exhaust gas as well as the SOx concentration of the exhaust gas.

According to further another aspect of the first invention, the SOx concentration acquiring apparatus may further comprise a pump cell (25). The pump cell (25) may be formed by the solid electrolyte layer (11, 21A), a first pump electrode (25A), and a second pump electrode (25B). The first pump electrode (25A) may be provided on one of the opposite surfaces of the solid electrolyte layer (11, 21A) such that the first pump electrode (25A) exposes to the exhaust gas. The second pump electrode (25B) may be provided on the other surface of the solid electrolyte layer (11, 21A). In this case, the electronic control unit (90) may be further configured to execute a pump voltage control for applying a voltage (Vpp) capable of decreasing an oxygen concentration of the exhaust gas to generally zero to the pump cell (25) and a constant voltage control for controlling the sensor voltage (Vss) to a constant voltage lower than the oxygen increasing voltage (Vox_in). The electronic control unit (90) may be further configured to acquire a NOx concentration (Cnox) of the exhaust gas on the basis of the sensor current (Iss_oxy) acquired while the electronic control unit (90) executes the pump voltage control and the constant voltage control. Thereby, the SOx concentration acquiring apparatus according to this aspect can acquire the NOx concentration of the exhaust gas as well as the SOx concentration of the exhaust gas.

According to further another aspect of the first invention, the electronic control unit (90) may be further configured to acquire an oxygen concentration (Coxy) of the exhaust gas on the basis of a pump current (Ipp_oxy) which is a current (Ipp) flowing through the pump cell (25) while the electronic control unit (90) executes the pump voltage control (see the step 2485 and a step 2490 in FIG. 24). Thereby, the SOx concentration acquiring apparatus according to this aspect can acquire the oxygen concentration of the exhaust gas as well as the SOx concentration and the NOx concentration of the exhaust gas.

A SOx concentration acquiring apparatus of an internal combustion engine (50) according to the second invention comprises a sensor cell (15, 26) and an electronic control unit (90). The sensor cell (15, 26) is formed by a solid electrolyte layer (11, 21A), a first sensor electrode (15A, 26A), and a second sensor electrode (15B, 26B). The first sensor electrode (15A, 26A) is provided on one of opposite surfaces of the solid electrolyte layer (11, 21A) such that the first sensor electrode (11, 21A) exposes to an exhaust gas discharged from the internal combustion engine (50). The second sensor electrode (15B, 26B) is provided on the other surface of the solid electrolyte layer (11, 21A).

The electronic control unit (90) controls a sensor voltage (Vss) which is a voltage applied to the sensor cell (15, 26) and acquires a sensor current (Iss) which is a current flowing through the sensor cell (15, 26).

The electronic control unit (90) is configured to execute a decomposition voltage increasing control for increasing the sensor voltage (Vss) from a first voltage lower than an oxygen increasing voltage (Vox_in) to a second voltage (Vup_end) equal to or higher than the oxygen increasing voltage (Vox_in) (see the step 920 in FIG. 9 and the step 1710 in FIG. 17). The oxygen increasing voltage (Vox_in) is a voltage, at which an amount of oxygen component produced by SOx decomposing to sulfur component and the oxygen component is larger than the amount of the oxygen component consumed by the sulfur component being oxidized by the oxygen component to the SOx. The electronic control unit (90) is further configured to execute a reoxidation voltage decreasing control for decreasing the sensor voltage (Vss) from the second voltage (Vup_end) to a third voltage (Vdown_end) lower than an oxygen decreasing voltage (Vox_de) after the electronic control unit (90) executes the decomposition voltage increasing control (see the step 940 in FIG. 9 and the step 1730 in FIG. 17). The oxygen decreasing voltage (Vox_de) is a voltage, at which the amount of the oxygen component consumed by the sulfur component being oxidized by the oxygen component to the SOx is larger than the amount of the oxygen component produced by the SOx decomposing to the sulfur component and the oxygen component. The electronic control unit (90) is further configured to acquire the sensor currents (Iss) as SOx concentration currents (Iss_sox), respectively after the sensor voltage (Vss) reaches the oxygen decreasing voltage (Vox_de) while the electronic control unit (90) executes the reoxidation voltage decreasing control (see the step 945 in FIG. 9). The electronic control unit (90) is further configured to acquire the sensor current (Iss) as a high-voltage current (Ihigh) when the sensor voltage (Vss) decreases to a fourth voltage equal to or lower than the oxygen decreasing voltage (Vox_de) (see a step 1810 in FIG. 18). The electronic control unit (90) is further configured to acquire the sensor current (Iss) as a low-voltage current (Ilow) when the sensor voltage (Vss) decreases to a fifth voltage (Vdown_end) lower than the fourth voltage (see a step 1670 in FIG. 16). The electronic control unit (90) is further configured to acquire a change rate of the sensor current (Iss) as a sensor current change rate (R) while the sensor current (Iss) changes from the high-voltage current (Ihigh) to the low-voltage current (Ilow) (see a step 1820 in FIG. 18). The electronic control unit (90) is further configured to acquire currents which change from the high-voltage current (Ihigh) at the sensor current change rate (R) and correspond to the sensor voltages (Vss), at which the electronic control unit (90) acquires the SOx concentration currents (Iss_sox), as base currents (Ibase), respectively (see a step 1820 in FIG. 18). The electronic control unit (90) is further configured to acquire an integration value (S21, S22) of differences (dIss) between each of the base currents (Ibase) and each of the SOx concentration currents (Iss_sox) (see a step 1835 in FIG. 18). The electronic control unit (90) is further configured to acquire a SOx concentration (Csox) of the exhaust gas on the basis of the integration value (S21, S22) (see a step 1840 in FIG. 18).

The sensor current change rate acquired on the basis of the high-voltage current and the low-voltage current, is a value generally corresponding to a change rate of the sensor current after the sensor voltage reaches the oxygen decreasing voltage when the SOx concentration of the exhaust gas is zero. In addition, the base currents are acquired from the currents changing from the high-voltage current at the sensor current change rate acquired on the basis of the high-voltage current and the low-voltage current. Therefore, the differences between each of the base currents and each of the SOx concentration currents are values which include almost no component of the sensor current not subject to the oxidizing reaction of the sulfur component. Therefore, when the SOx concentration changes, a proportion of change of the integration value is larger than a proportion of change of a difference between the base current not subject to the oxidizing reaction of the sulfur component derived from the SOx and the SOx concentration current. Thus, the integration value represents a change of the SOx concentration explicitly. The SOx concentration acquiring apparatus according to the second invention acquires the SOx concentration by using such an integration value. Thus, the SOx concentration acquiring apparatus can acquire the SOx concentration accurately.

According to an aspect of the second invention, the electronic control unit (90) may be further configured to acquire the sensor current (Iss) as the high-voltage current (Ihigh) when the sensor voltage (Vss) reaches the fourth voltage (see a step 1730 in FIG. 17 and a step 1810 in FIG. 18).

The SOx concentration acquiring apparatus according to this aspect acquires the high-voltage current while the SOx concentration acquiring apparatus executes the reoxidation voltage decreasing control. The reoxidation voltage decreasing control is executed for acquiring the SOx concentration currents used for acquiring the SOx concentration. Therefore, an additional control for decreasing the sensor voltage does not need to be executed for acquiring the high-voltage current. Thus, the SOx concentration acquiring apparatus can acquire the SOx concentration for a short time.

Further, the SOx concentration acquiring apparatus according to this aspect acquires the high-voltage current while the SOx concentration acquiring apparatus executes the reoxidation voltage decreasing control for acquiring the SOx concentration currents. Therefore, conditions relating to the SOx concentration of the exhaust gas, the decomposing reaction of the SOx at the first sensor electrode, the oxidizing reaction of the sulfur component at the first sensor electrode, and the like when the high-voltage current is acquired, are the same as those when the SOx concentration currents are acquired. Thus, the SOx concentration acquiring apparatus can acquire the high-voltage current suitable for acquiring the SOx concentration accurately. Therefore, the SOx concentration acquiring apparatus can acquire the SOx concentration accurately.

According to another aspect of the second invention, the electronic control unit (90) may be further configured to set the oxygen decreasing voltage (Vox_de) as the fourth voltage (see a step 1810 in FIG. 18).

The SOx concentration acquiring apparatus according to this aspect acquires the sensor current as the high-voltage current when the sensor voltage reaches the oxygen decreasing voltage. The oxygen decreasing voltage is the sensor voltage, at which the amount of the oxygen component consumed by the sulfur component being oxidized to the SOx is larger than the amount of the oxygen component produced by the SOx decomposing to the sulfur component and the oxygen component. Therefore, the differences between each of the base currents and each of the SOx concentration currents include the component of the sensor current subject to the oxidizing reaction of the sulfur component to a large extent. As a result, the change of the integration value is large when the SOx concentration changes. Therefore, the integration value represents the change of the SOx concentration explicitly. The SOx concentration acquiring apparatus according to this aspect acquires the SOx concentration by using such an integration value. Thus, the SOx concentration acquiring apparatus can acquire the SOx concentration accurately.

According to further another aspect of the second invention, the electronic control unit (90) may be further configured to execute a preliminary voltage increasing control for increasing the sensor voltage (Vss) to a sixth voltage lower than the fourth voltage and the oxygen decreasing voltage (Vox_de) (see a step 1635 in FIG. 16). In this case, the electronic control unit (90) may be further configured to execute a preliminary voltage decreasing control for decreasing the sensor voltage (Vss) from the sixth voltage to a voltage equal to or lower than the fifth voltage after the electronic control unit (90) executes the preliminary voltage increasing control (see a step 1655 in FIG. 16). The electronic control unit (90) may be further configured to acquire the sensor current (Iss) as the low-voltage current (Ilow) when the sensor voltage (Vss) reaches the fifth voltage while the electronic control unit (90) executes the preliminary voltage decreasing control (see a step 1670 in FIG. 16).

The low-voltage current is used for acquiring the sensor current change rate. The sensor current change rate is desirably near the change rate of the SOx concentration current with the SOx concentration of the exhaust gas being zero. Therefore, the low-voltage current is desirably the sensor current acquired when the sensor voltage reaches the fifth voltage with the SOx concentration of the exhaust gas being zero. That is, the low-voltage current is desirably the sensor current not subject to the decomposing reaction of the SOx and the oxidizing reaction of the sulfur component.

While the preliminary voltage increasing control and the preliminary voltage decreasing control are executed, the sensor voltage changes within a range of the sensor voltage lower than the oxygen increasing voltage. Therefore, while the preliminary voltage increasing control and the preliminary voltage decreasing control are executed, almost no SOx decomposes and almost no sulfur component is oxidized. Therefore, in general, the sensor current acquired while the preliminary voltage decreasing control is executed, is not subject to the decomposing reaction of the SOx and the oxidizing reaction of the sulfur component. Therefore, the SOx concentration acquiring apparatus according to this aspect can acquire the sensor current change rate near the change rate of the SOx concentration current with the SOx concentration of the exhaust gas being zero by acquiring the sensor current as the low-voltage current when the sensor voltage reaches the fifth voltage while the SOx concentration acquiring apparatus executes the preliminary voltage decreasing control.

According to further another aspect of the second invention, the electronic control unit (90) may be further configured to acquire the sensor current (Iss) as the low-voltage current (Ilow) when the sensor voltage (Vss) reaches the fifth voltage while the electronic control unit (90) executes the reoxidation voltage decreasing control (see a step 2080 in FIG. 20).

The SOx concentration acquiring apparatus according to this aspect acquires the low-voltage current while the SOx concentration acquiring apparatus executes the reoxidation voltage decreasing control. The reoxidation voltage decreasing control is executed for acquiring the SOx concentration currents used for acquiring the SOx concentration. Therefore, an additional control for decreasing the sensor voltage does not need to be executed for acquiring the low-voltage current. Thus, the SOx concentration acquiring apparatus can acquire the SOx concentration for a short time.

Further, the SOx concentration acquiring apparatus according to this aspect acquires the low-voltage current while the SOx concentration acquiring apparatus executes the reoxidation voltage decreasing control for acquiring the SOx concentration currents. Therefore, conditions relating to the SOx concentration of the exhaust gas, the decomposing reaction of the SOx at the first sensor electrode, the oxidizing reaction of the sulfur component at the first sensor electrode, and the like when the low-voltage current is acquired, are the same as those when the SOx concentration currents are acquired. Thus, the SOx concentration acquiring apparatus can acquire the high-voltage current suitable for acquiring the SOx concentration accurately. Therefore, the SOx concentration acquiring apparatus can acquire the SOx concentration accurately.

According to further another aspect of the second invention, the electronic control unit (90) may be further configured to set, as the third voltage (Vdown_end), the sensor voltage, at which all the sulfur component is expected to be reoxidized while the electronic control unit (90) executes the reoxidation voltage decreasing control.

When the sensor voltage, at which all of the sulfur component is expected to be oxidized, is set as the third voltage, the SOx concentration acquiring apparatus according to this aspect can acquire the sensor currents subject to an oxidizing reaction of the sulfur component as the SOx concentration currents in a wide range of the sensor voltage. Thereby, the change of the integration value is large when the SOx concentration changes. Thus, the SOx concentration acquiring apparatus can acquire the SOx concentration accurately.

According to further another aspect of the second invention, the electronic control unit (90) may be further configured to execute a constant voltage control for controlling the sensor voltage (Vss) to a voltage lower than the oxygen increasing voltage (Vox_in) before the electronic control unit (90) executes the decomposition voltage increasing control after the electronic control unit (90) executes the reoxidation voltage decreasing control (see the step 980 in FIG. 9 and the step 1550 in FIG. 15). In this case, the electronic control unit (90) may be further configured to acquire an oxygen concentration (Coxy) of the exhaust gas on the basis of the sensor current (Iss_oxy) acquired while the electronic control unit (90) executes the constant voltage control (see the steps 985 and 990 in FIG. 9 and the steps 1560 and 1570 in FIG. 15). Thereby, the SOx concentration acquiring apparatus according to this aspect can acquire the oxygen concentration of the exhaust gas as well as the SOx concentration of the exhaust gas.

According to further another aspect of the second invention, the SOx concentration acquiring apparatus may comprise the solid electrolyte layer (21A) as a first solid electrolyte layer. In this case, the SOx concentration acquiring apparatus may further comprise a pump cell (25). The pump cell (25) may be formed by a second solid electrolyte layer (21B), a first pump electrode (25A), and a second pump electrode (25B). The first pump electrode (25A) may be provided on one of opposite surfaces of the second solid electrolyte layer (21B) such that the first pump electrode (25A) exposes to the exhaust gas. The second pump electrode (25B) may be provided on the other surface of the second solid electrolyte layer (21B). In this case, the electronic control unit (90) may be further configured to execute a pump voltage control for applying a voltage (Vpp) capable of decreasing an oxygen concentration of the exhaust gas to generally zero to the pump cell (25) and a constant voltage control for controlling the sensor voltage (Vss) to a constant voltage lower than the oxygen increasing voltage (Vox_in) (see the step 2480 in FIG. 24). The electronic control unit (90) may be further configured to acquire a NOx concentration (Cnox) of the exhaust gas on the basis of the sensor current (Iss_nox) acquired while the electronic control unit (90) executes the pump voltage control and the constant voltage control (see the steps 2485 and 2487 in FIG. 24). Thereby, the SOx concentration acquiring apparatus according to this aspect can acquire the NOx concentration of the exhaust gas as well as the SOx concentration of the exhaust gas.

According to further another aspect of the second invention, the SOx concentration acquiring apparatus may further comprise a pump cell (25). The pump cell (25) may be formed by the solid electrolyte layer (11, 21A), a first pump electrode (25A), and a second pump electrode (25B). The first pump electrode (25A) may be provided on one of the opposite surfaces of the solid electrolyte layer (11, 21A) such that the first pump electrode (25A) exposes to the exhaust gas. The second pump electrode (25B) may be provided on the other surface of the solid electrolyte layer (11, 21A). In this case, the electronic control unit (90) may be further configured to execute a pump voltage control for applying a voltage (Vpp) capable of decreasing an oxygen concentration of the exhaust gas to generally zero to the pump cell (25) and a constant voltage control for controlling the sensor voltage (Vss) to a constant voltage lower than the oxygen increasing voltage (Vox_in). The electronic control unit (90) may be further configured to acquire a NOx concentration (Cnox) of the exhaust gas on the basis of the sensor current (Iss) acquired while the electronic control unit (90) executes the pump voltage control and the constant voltage control. Thereby, the SOx concentration acquiring apparatus according to this aspect can acquire the NOx concentration of the exhaust gas as well as the SOx concentration of the exhaust gas.

According to further another aspect of the second invention, the electronic control unit (90) may be further configured to acquire an oxygen concentration (Coxy) of the exhaust gas on the basis of a pump current (Ipp_oxy) which is a current (Ipp) flowing through the pump cell (25) while the electronic control unit (90) executes the pump voltage control (see the steps 2485 and 2490 in FIG. 24). Thereby, the SOx concentration acquiring apparatus according to this aspect can acquire the oxygen concentration of the exhaust gas as well as the SOx concentration and the NOx concentration of the exhaust gas.

In the above description, for facilitating understanding of the present invention, elements of the present invention corresponding to elements of an embodiment described later are denoted by reference symbols used in the description of the embodiment accompanied with parentheses. However, the elements of the present invention are not limited to the elements of the embodiment defined by the reference symbols. The other objects, features and accompanied advantages of the present invention can be easily understood from the description of the embodiment of the present invention along with the drawings.

BRIEF DESCRIPTION OF THE DRAWINGS

FIG. 15 is a view for showing a flowchart illustrating a routine executed by the CPU of the ECU of the SOx concentration acquiring apparatus according to the modified example.

DESCRIPTION OF THE PREFERRED EMBODIMENTS

Below, a SOx concentration acquiring apparatus of an internal combustion engine according to embodiments of the invention will be described with reference to the drawings. The SOx concentration acquiring apparatus according to a first embodiment of the invention is applied to the internal combustion engine 50 shown in FIG. 1. Hereinafter, the SOx concentration acquiring apparatus according to the first embodiment will be referred to as "the first embodiment apparatus".

The internal combustion engine 50 is a spark-ignition internal combustion engine (i.e., a so-called gasoline engine). In this connection, the invention may be applied to a compression-ignition internal combustion engine (i.e., a so-called diesel engine). The internal combustion engine 50 shown in FIG. 1 operates at a stoichiometric air-fuel ratio in a substantial engine operation region.

Figure 1:
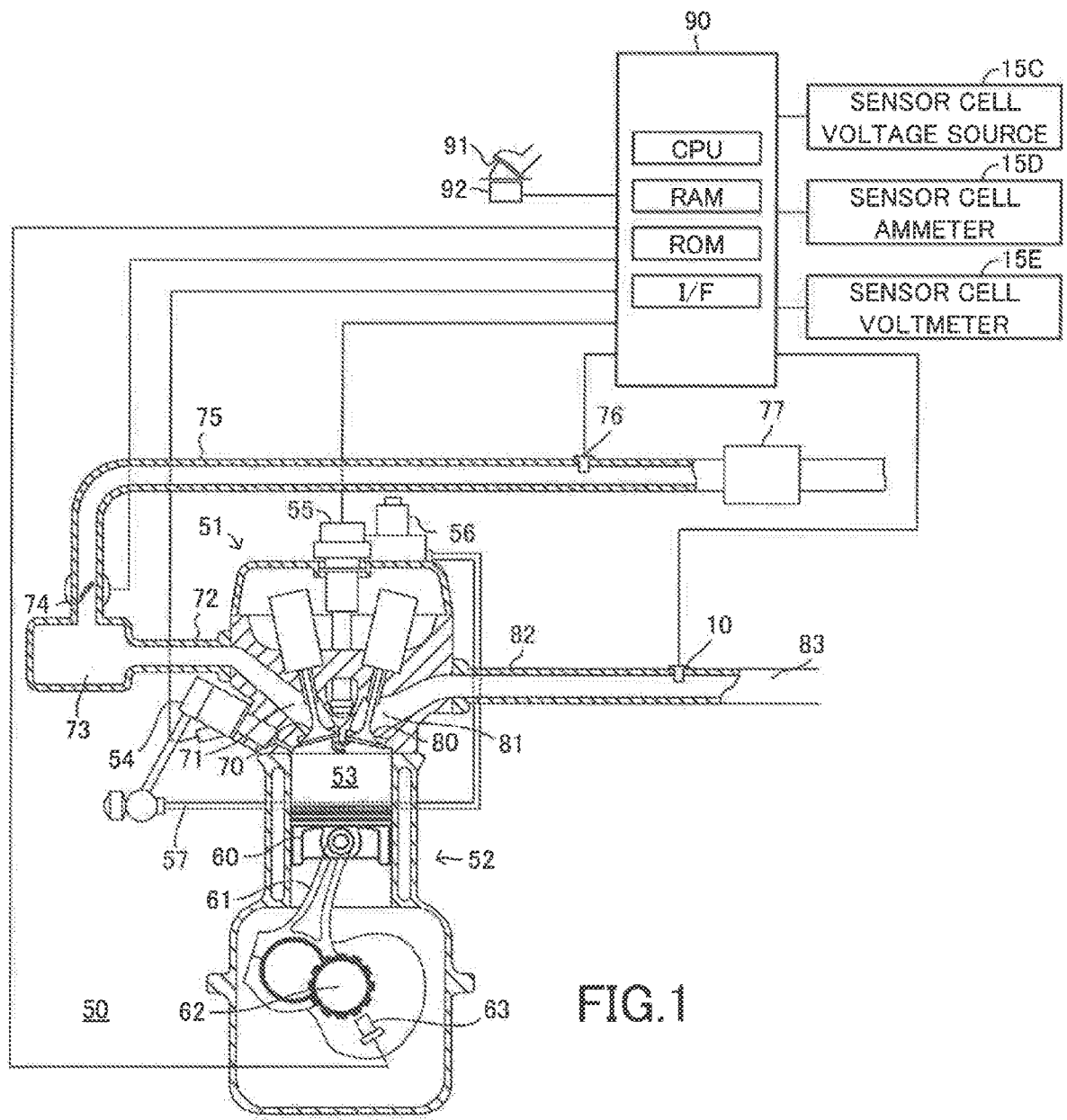
FIG. 1 is a view for showing an internal combustion engine provided with a SOx concentration acquiring apparatus according to a first embodiment of the invention.

In FIG. 1, a reference sign 51 denotes a cylinder head, 52 denotes a cylinder block, 53 denotes combustion chambers, 54 denotes fuel injectors, 55 denotes spark plugs, 56 denotes a fuel pump, 57 denotes a fuel supply pipe, 60 denotes pistons, 61 denotes connecting rods, 62 denotes a crank shaft, 63 denotes a crank angle sensor, 70 denotes intake valves, 71 denotes intake ports, 72 denotes an intake manifold, 73 denotes a surge tank, 74 denotes a throttle valve, 75 denotes an intake pipe, 76 denotes an air-flow meter, 77 denotes an air filter, 80 denotes exhaust valves, 81 denotes exhaust ports, 82 denotes an exhaust manifold, 83 denotes an exhaust pipe, 90 denotes an electronic control unit, 91 denotes an acceleration pedal, and 92 denotes an acceleration pedal operation amount sensor. Hereinafter, the electronic control unit 90 will be referred to as "the ECU 90".

The fuel injectors 54, the ignition plugs 55, the throttle valve 74, the crank angle sensor 63, the air-flow meter 76, the acceleration pedal operation amount sensor 92, and a limiting current sensor 10 are electrically connected to the ECU 90.

The ECU 90 is an electronic control circuit including as a main component a microcomputer including a CPU, a ROM, a RAM, an interface, etc. The CPU realizes various functions by executing instructions or routines stored in a memory (i.e., the ROM).

The ECU 90 is configured to send signals to the fuel injectors 54, the ignition plugs 55, and the throttle valve 74 for activating the fuel injectors 54, the ignition plugs 55, and the throttle valve 74, respectively. The ECU 90 receives signals from the crank angle sensor 63, the air-flow meter 76, and the acceleration pedal operation amount sensor 92. The crank angle sensor 63 outputs a signal corresponding to a rotation speed of the crank shaft 62. The ECU 90 calculates an engine speed (i.e., a rotation speed of the internal combustion engine 50) on the basis of the signals output from the crank angle sensor 63. The air-flow meter 76 outputs a signal corresponding to a flow rate of an air passing the air-flow meter 76, that is, a flow rate of the air flowing into the combustion chambers 53. The ECU 90 calculates an intake air amount (i.e., an amount of the air flowing into the combustion chambers 53) on the basis of the signals output from the air-flow meter 76. The acceleration pedal operation amount sensor 92 outputs a signal corresponding to an operation amount of the acceleration pedal 91. The ECU 90 calculates an engine load KL (i.e., a load of the internal combustion engine 50) on the basis of the signals output from the acceleration pedal operation amount sensor 92.

The first embodiment apparatus includes the limiting current sensor 10, a sensor cell voltage source 15C, a sensor cell ammeter 15D, a sensor cell voltmeter 15E, and the ECU 90. The sensor 10 is a single-cell type limiting current sensor. The sensor 10 is provided on the exhaust pipe 83.

Figure 2:
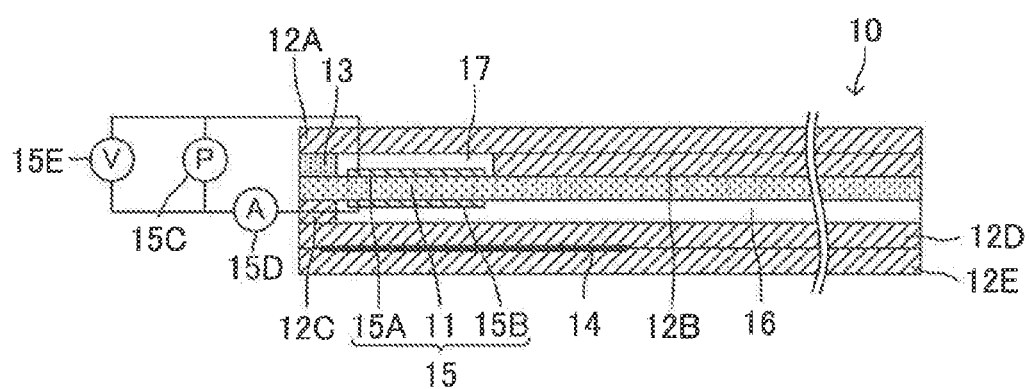
FIG. 2 is a view for showing an inner configuration of a limiting current sensor of the SOx concentration acquiring apparatus according to the first embodiment.

As shown in FIG. 2, the sensor 10 includes a solid electrolyte layer 11, a first alumina layer 12A, a second alumina layer 12B, a third alumina layer 12C, a fourth alumina layer 12D, a fifth alumina layer 12E, a diffusion-limited layer 13, a heater 14, a sensor cell 15, a first sensor electrode 15A, a second sensor electrode 15B, an atmospheric air introduction passage 16, and an interior space 17.

The solid electrolyte layer 11 is a layer formed of zirconia or the like and has oxygen ion conductive property. The alumina layers 12A to 12E are layers formed of alumina, respectively. The diffusion-limited layer 13 is a porous layer, through which an exhaust gas discharged from the combustion chambers 53 of the engine 50 can flow. In the sensor 10, the layers are laminated such that the fifth alumina layer 12E, the fourth alumina layer 12D, the third alumina layer 12C, the solid electrolyte layer 11, the diffusion-limited layer 13 and the second alumina layer 12B, and the first alumina layer 12A are positioned in order from the lower side of FIG. 2. The heater 14 is positioned between the fourth and fifth alumina layers 12D and 12E.

The atmospheric air introduction passage 16 is a space defined by the solid electrolyte layer 11, the third alumina layer 12C, and the fourth alumina layer 12D, and a part of the atmospheric air introduction passage 16 opens to the atmosphere. The interior space 17 is a space defined by the first alumina layer 12A, the solid electrolyte layer 11, the diffusion-limited layer 13, and the second alumina layer 12B, and a part of the interior space 17 communicates with the outside of the sensor 10 via the diffusion-limited layer 13.

The first and second sensor electrodes 15A and 15B are electrodes formed of material having a high reducing property, for example, platinum group element such as platinum and rhodium or alloy of the platinum group element. The first sensor electrode 15A is positioned on one of opposite surfaces of the solid electrolyte layer 11 (that is, the surface of the solid electrolyte layer 11 which defines the interior space 17). The second sensor electrode 15B is positioned on the other surface of the solid electrolyte layer 11 (that is, the surface of the solid electrolyte layer 11 which defines the atmospheric air introduction passage 16). The first sensor electrode 15A, the second sensor electrode 15B, and the solid electrolyte layer 11 form the sensor cell 15.

The exhaust gas discharged from the engine 50 flows into the interior space 17 through the diffusion-limited layer 13. The first sensor electrode 15A exposes to the exhaust gas flowing into the interior space 17.

The sensor 10 is configured to be able to apply a voltage from the sensor cell voltage source 15C to the sensor cell 15 (in particular, to the second sensor electrode 15B so as to produce an electric potential difference with respect to the first sensor electrode 15A). The sensor cell voltage source 15C is configured to apply a direct voltage to the sensor cell 15. It should be noted that the first sensor electrode 15A is a cathode side electrode, and the second sensor electrode 15B is an anode side electrode when the sensor cell voltage source 15C applies the direct voltage to the sensor cell 15.

The heater 14, the sensor cell voltage source 15C, the sensor cell ammeter 15D, and the sensor cell voltmeter 15E are electrically connected to the ECU 90.

The ECU 90 controls an activation of the heater 14 to maintain a temperature of the sensor cell 15 at a sensor activating temperature, at which the sensor 10 is activated.

In addition, the ECU 90 controls a voltage of the sensor cell voltage source 15C to apply a voltage set as described later to the sensor cell 15 from the sensor cell voltage source 15C.

The sensor cell ammeter 15D detects a current Iss flowing through a circuit including the sensor cell 15 and outputs a signal representing the detected current Iss to the ECU 90. The ECU 90 acquires the current Iss on the basis of the signal. Hereinafter, the current Iss will be referred to as "the sensor current Iss".

The sensor cell voltmeter 15E detects a voltage Vss applied to the sensor cell 15 and outputs a signal representing the detected voltage Vss to the ECU 90. The ECU 90 acquires the voltage Vss on the basis of the signal. Hereinafter, the voltage Vss will be referred to as "the sensor voltage Vss".

Summary of Operation of First Embodiment Apparatus

<Acquisition of Exhaust SOx Concentration>
When the voltage is applied to the sensor cell 15, and SOx (i.e., sulfur oxide) included in the exhaust gas flowing into the interior space 17 contacts the first sensor electrode 15A, the SOx is reduced and decomposed on the first sensor electrode 15A, oxygen component of the SOx becomes oxygen ion and then, the oxygen ion moves toward the second sensor electrode 15B through the solid electrolyte layer 11. At this time, an electric current proportional to an amount of the oxygen ion, which has moved through the solid electrolyte layer 11, flows between the first and second sensor electrodes 15A and 15B. Then, when the oxygen ion reaches the second sensor electrode 15B, the oxygen ion becomes oxygen on the second sensor electrode 15B and then, is discharged to the atmospheric air introduction passage 16.

Figure 3:
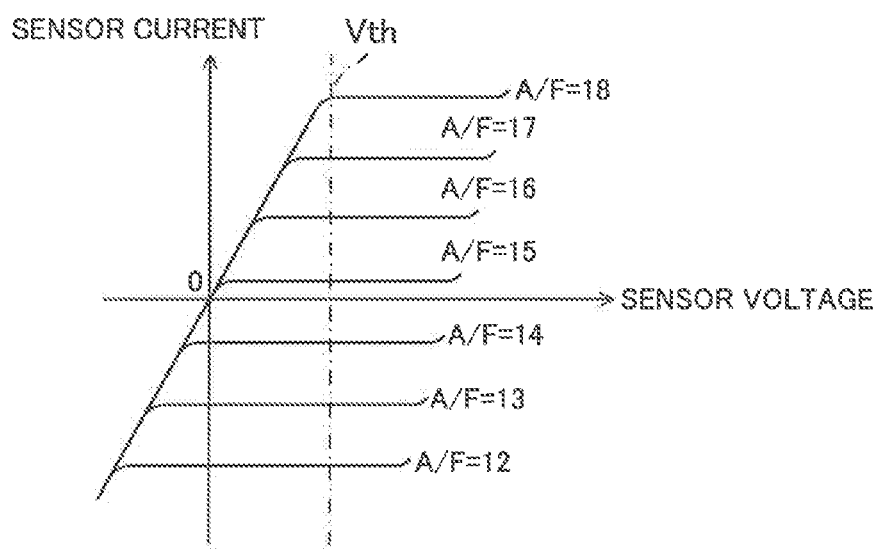
FIG. 3 is a view for showing a relationship among a voltage applied to a sensor cell of the limiting current sensor of the SOx concentration acquiring apparatus according to the first embodiment, a current flowing through the sensor cell, and an oxygen concentration of the exhaust gas just discharged from the internal combustion engine.

A relationship among the sensor voltage Vss, the sensor current Iss, and an air-fuel ratio A/F of the exhaust gas just discharged from the engine 50, is shown in FIG. 3. The sensor voltage Vss is a direct voltage applied to the sensor cell 15 by the sensor cell voltage source 15C. The sensor current Iss is an electric current flowing between the first and second sensor electrodes 15A and 15B when the direct voltage is applied to the sensor cell 15. The air-fuel ratio A/F of the exhaust gas corresponds to an air-fuel ratio of a mixture formed in the combustion chambers 53. Hereinafter, the air-fuel ratio A/F of the exhaust gas will be referred to as "the exhaust air-fuel ratio A/F".

In FIG. 3, a line denoted by A/F=12 shows a change of the sensor current Iss relative to a change of the sensor voltage Vss in case that the exhaust gas air-fuel ratio A/F is 12. Similarly, lines denoted by A/F=13 to A/F=18 show changes of the sensor current Iss relative to changes of the sensor voltage Vss in case that the exhaust air-fuel ratios A/F are 13 to 18, respectively.

For example, in case that the exhaust gas air-fuel ratio A/F is 18, and the sensor voltage Vss is within a range lower than a predetermined value Vth, when the sensor current Iss is a negative value, an absolute value of the sensor current Iss decreases as the sensor voltage Vss increases. On the other hand, when the sensor current Iss is a positive value, the absolute value of the sensor current Iss increases as the sensor voltage Vss increases. Further, in case that the sensor voltage Vss is within a constant range higher than or equal to the predetermined value Vth, the sensor current Iss is a constant value, independently of the sensor voltage Vss. Hereinafter, the predetermined value Vth will be referred to as "the limiting current range lower limit voltage".

Similarly, this relationship between the sensor voltage Vss and the sensor current Iss is established in case that the exhaust gas air-fuel ratios A/F are 12 to 17, respectively.

Figure 4A:
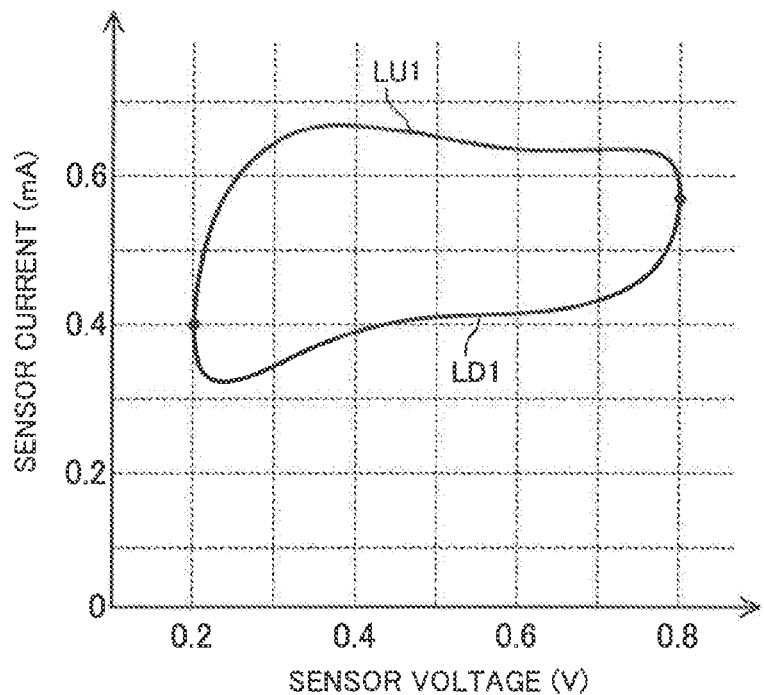
FIG. 4A is a view for showing a relationship between the voltage applied to the sensor cell and the current flowing through the sensor cell.

From a study, the inventors of this application have a new knowledge that the sensor current Iss changes as shown in FIG. 4A while gradually increasing the sensor voltage Vss from 0.2 V to 0.8 V and then, gradually decreasing the sensor voltage Vss from 0.8 V to 0.2 V when the exhaust gas including no SOx and having a constant oxygen concentration, reaches the first sensor electrode 15A.

As shown by a line LU1 in FIG. 4A, the sensor current Iss is about 0.4 mA when the sensor voltage Vss is 0.2 V. When the sensor voltage Vss starts to increase from 0.2 V, the sensor current Iss starts to increase from about 0.4 mA. While the sensor voltage Vss increases to about 0.35 V, the sensor current Iss increases rapidly. When the sensor voltage Vss reaches about 0.35 V, the sensor current Iss starts to decrease. While the sensor voltage Vss reaches about 0.6 V after the sensor voltage Vss reaches about 0.35 V, the sensor current Iss decreases slightly. When the sensor voltage Vss reaches about 0.6 V, the sensor current Iss starts to increase. While the sensor voltage Vss increases to about 0.75 V after the sensor voltage Vss reaches about 0.6 V, the sensor current Iss increases slightly. When the sensor voltage Vss reaches about 0.75 V, the sensor current Iss starts to decrease. When the sensor voltage Vss reaches 0.8 V, the sensor current Iss reaches about 0.55 mA.

When the sensor voltage Vss starts to decrease from 0.8 V, the sensor current Iss starts to decrease from about 0.5 mA as shown by a line LD1 in FIG. 4A. While the sensor voltage Vss decreases after the sensor voltage Vss reaches about 0.6 V, the sensor current Iss is generally constant at a current slightly higher than 0.4 mA. While the sensor voltage Vss decreases after the sensor voltage Vss reaches about 0.5 V, the sensor current Iss decreases. After the sensor voltage Vss reaches a voltage slightly higher than 0.2 V, the sensor current Iss increases. When the sensor voltage Vss reaches 0.2 V, the sensor current Iss reaches about 0.4 mA.

Figure 4B:
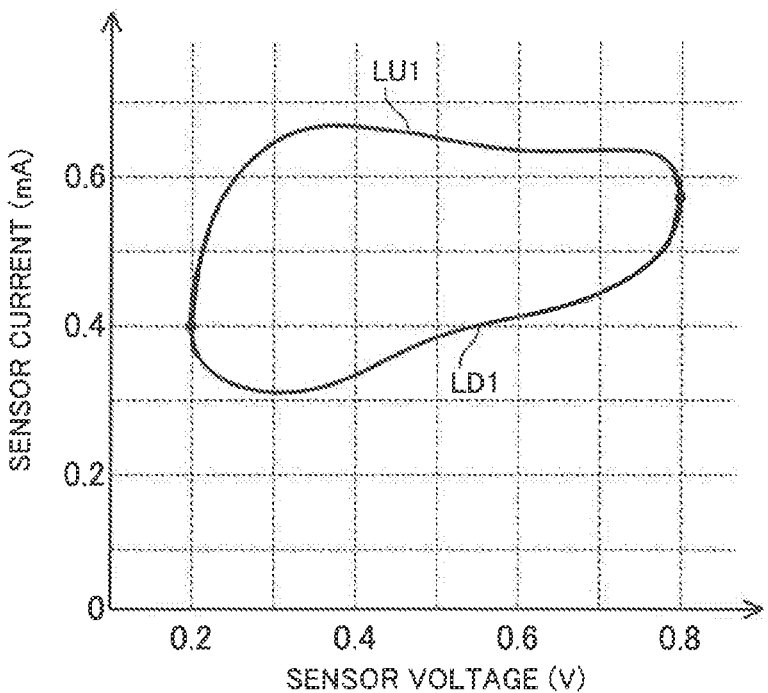
FIG. 4B is a view for showing a relationship between the voltage applied to the sensor cell and the current flowing through the sensor cell.

On the other hand, the inventors of this application have a new knowledge that the sensor current Iss changes as shown in FIG. 4B while gradually increasing the sensor voltage Vss from 0.2 V to 0.8 V and then, gradually decreasing the sensor voltage Vss from 0.8 V to 0.2 V when the exhaust gas including the SOx and having the constant oxygen concentration reaches the first sensor electrode 15A.

Similar to an example shown in FIG. 4A, as shown by a line LU1 in FIG. 4B, when the sensor voltage Vss is 0.2 V, the sensor current Iss is about 0.4 mA. When the sensor voltage Vss starts to increase from 0.2 V, the sensor current Iss starts to increase from about 0.4 mA. The sensor current Iss increases rapidly while the sensor voltage Vss increases to about 0.35 V. When the sensor voltage Vss reaches about 0.35 V, the sensor current Iss starts to decrease. While the sensor voltage Vss increases to about 0.6 V after the sensor voltage Vss reaches about 0.35 V, the sensor current Iss decreases moderately. When the sensor voltage Vss reaches about 0.6 V, the sensor current Iss starts to increase. While the sensor voltage Vss increases to about 0.75 V after the sensor voltage Vss reaches about 0.6 V, the sensor current Iss increases moderately. When the sensor voltage Vss reaches about 0.7 V, the sensor current Iss starts to decrease. When the sensor voltage Vss reaches 0.8 V, the sensor current Iss reaches about 0.55 mA.

When the sensor voltage Vss starts to decrease from 0.8 V, the sensor current Iss starts to decrease from about 0.55 mA as shown by a line LD1 in FIG. 4B. While the sensor voltage Vss decreases to about 0.3 V, the sensor current Iss continues to decrease. While the sensor voltage Vss increases to about 0.6 V, and the sensor current Iss continues to decrease, a decreasing rate of the sensor current Iss decreases. After the sensor voltage Vss reaches about 0.6 V, the decreasing rate of the sensor current Iss increases gradually. When the sensor voltage Vss reaches about 0.3 V, the sensor current Iss reaches a minimum value of about 0.31 mA and starts to increase. When the sensor voltage Vss reaches 0.2 V, the sensor current Iss reaches about 0.4 mA.

The change of the sensor current Iss shown in FIG. 4B while the sensor voltage Vss decreases from 0.8 V to 0.2 V when the exhaust gas including the SOx reaches the first sensor electrode 15A, is different from the change of the sensor current Iss shown in FIG. 4A while the sensor voltage Vss decreases from 0.8 V to 0.2 V when the exhaust gas including no SOx reaches the first sensor electrode 15A.

In particular, the sensor current Iss while the sensor voltage Vss decreases from 0.8 V to 0.2 V when the exhaust gas including the SOx reaches the first sensor electrode 15A, is generally lower than the sensor current Iss while the sensor voltage Vss decreases from 0.8 V to 0.2 V when the exhaust gas including no SOx reaches the first sensor electrode 15A.

In the sensor 10, there is a phenomenon that the sensor current Iss is low while the sensor voltage Vss decreases from 0.8 V to 0.2 V when the exhaust gas includes the SOx, compared with when the exhaust gas includes no SOx. The inventors of this application have understood reasons for the phenomenon as described below.

When the sensor voltage Vss exceeds a certain value while the sensor voltage Vss increases from 0.2 V to 0.8 V, the SOx reaching the first sensor electrode 15A decomposes to sulfur component and oxygen component at the first sensor electrode 15A. The oxygen component changes to the oxygen ion and moves toward the second sensor electrode 15B through the solid electrolyte layer 11. The sulfur component adheres to the first sensor electrode 15A.

When the sensor voltage Vss decreases below a certain value while the sensor voltage Vss decreases from 0.8 V to 0.2 V, the sulfur component adhering to the first sensor electrode 15A is oxidized by the oxygen component around the first sensor electrode 15A, thereby returning to the SOx. At this time, a decomposing reaction of the SOx to the sulfur component and the oxygen component at the first sensor electrode 15A, may occur. However, an oxidizing reaction of the sulfur component adhering to the first sensor electrode 15A, is more dominant than the decomposing reaction. As a result, an amount of the oxygen component consumed by the oxidizing reaction in the interior space 17 is larger than an amount of the oxygen component produced from the SOx by the decomposing reaction. Thus, the amount of the oxygen ion moving toward the second sensor electrode 15B through the solid electrolyte layer 11 decreases. Therefore, the sensor current Iss decreases. Thus, the sensor current Iss is low while the sensor voltage Vss decreases from 0.8 V to 0.2 V when the exhaust gas includes the SOx, compared with when the exhaust gas includes no SOx.

In this embodiment, the voltage of 0.8 V is employed as a voltage suitable for causing a decomposing amount of the SOx at the first sensor electrode 15A to reach a large amount sufficient for acquiring a concentration of the SOx included in the exhaust gas just discharged from the engine 50 exactly while the sensor voltage Vss increases from 0.2 V to 0.8 V. Hereinafter, the concentration of the SOx will be referred to as "the SOx concentration", and the concentration of the SOx included in the exhaust gas just discharged from the engine 50 will be referred to as "the exhaust SOx concentration". Further, the sensor voltage Vss at a point of time when the sensor voltage Vss stops to increase, in this embodiment, the voltage of 0.8 V, will be referred to as "the increasing end voltage Vup_end". The increasing end voltage Vup_end is, for example, a voltage capable of causing reactions such as a decomposing reaction of water included in the exhaust gas at the first sensor electrode 15A other than the decomposing reaction of the SOx to occur to the minimum extent.

Further, in this embodiment, the voltage of 0.2 V is employed as a voltage suitable for causing an oxidizing amount of the sulfur component adhering to the first sensor electrode 15A to reach a large amount sufficient for acquiring the exhaust SOx concentration exactly while the sensor voltage Vss decreases from 0.8 V to 0.2 V. Hereinafter, the sensor voltage Vss at point of time when the sensor voltage Vss stops to decrease, in this embodiment, the voltage of 0.2 V, will be referred to as "the decreasing end voltage Vdown_end".

The inventors of this application have a following knowledge based on the above description. In the following description, sign "m" of sign "(m)" represents an integer which increases from "1". For example, the sensor current Iss(1) represents the first-acquired sensor current Iss, the sensor current Iss(2) represents the second-acquired sensor current Iss, and the sensor current Iss(m) represents the m-th-acquired sensor current Iss. Sign "n" of sign "(n)" represents optional one of the integers of 1 to m. Therefore, the sensor current Iss(n) represents one of the sensor currents Iss(1) to Iss(m).

The inventors of this application increased the sensor voltage Vss from a voltage lower than an oxygen increasing voltage Vox_in to a voltage higher than the oxygen increasing voltage Vox_in. The oxygen increasing voltage Vox_in is the sensor voltage Vss for causing an amount of the oxygen component produced by the decomposing reaction of the SOx to the sulfur component and the oxygen component to become larger than the amount of the oxygen component consumed by the oxidizing of the sulfur component to the SOx.

Then, the inventors of this application decreased the sensor voltage Vss from the voltage higher than the oxygen increasing voltage Vox_in to a voltage lower than an oxygen decreasing voltage Vox_de. The oxygen decreasing voltage Vox_de is the sensor voltage Vss for causing the amount of the oxygen component consumed by the oxidizing of the sulfur component to the SOx to become larger than the amount of the oxygen component produced by the decomposing reaction of the SOx to the sulfur component and the oxygen component. The inventors acquired the sensor current Iss as a base current Ibase when the sensor voltage Vss reached the oxygen decreasing voltage Vox_de after the sensor voltage Vss started to decrease. In addition, the inventors acquired the sensor currents Iss(1) to Iss(m) after the sensor voltage Vss reached the oxygen decreasing voltage Vox_de.

Figure 5:
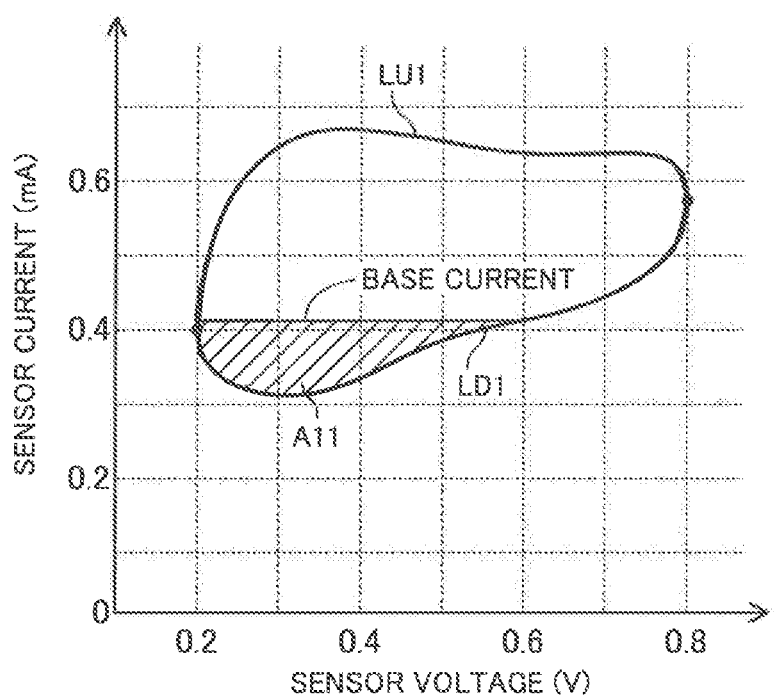
FIG. 5 is a view for showing a relationship between the voltage applied to the sensor cell and the current flowing through the sensor cell.
Figure 6:
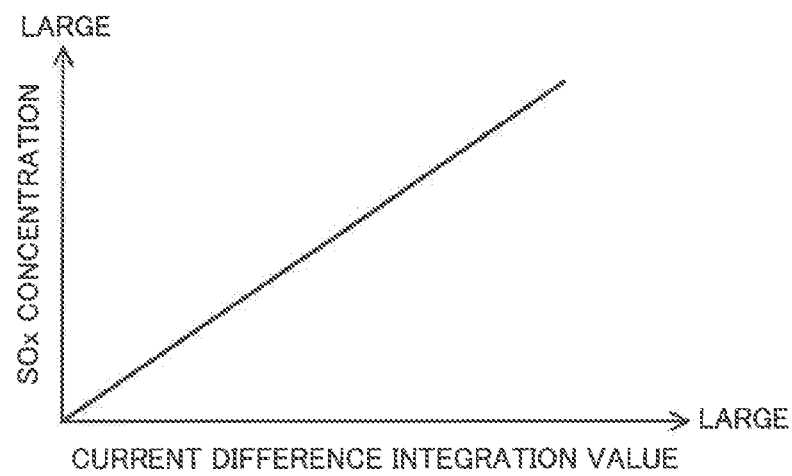
FIG. 6 is a view for showing a relationship between a current difference integration value and a SOx concentration of the exhaust gas just discharged from the internal combustion engine.

Then, the inventors of this application acquired an integration value S11 of differences dIss(n) between each of the acquired sensor currents Iss(n), that is, the acquired sensor currents Iss(1) to Iss(m) and the base current Ibase (dIss(n) =Ibase−Iss(n)). The integration value S11 corresponds to an area shown by a reference sign A11 in FIG. 5. As shown in FIG. 6, the exhaust SOx concentration increases as the integration value S11 increases.

Figure 7:
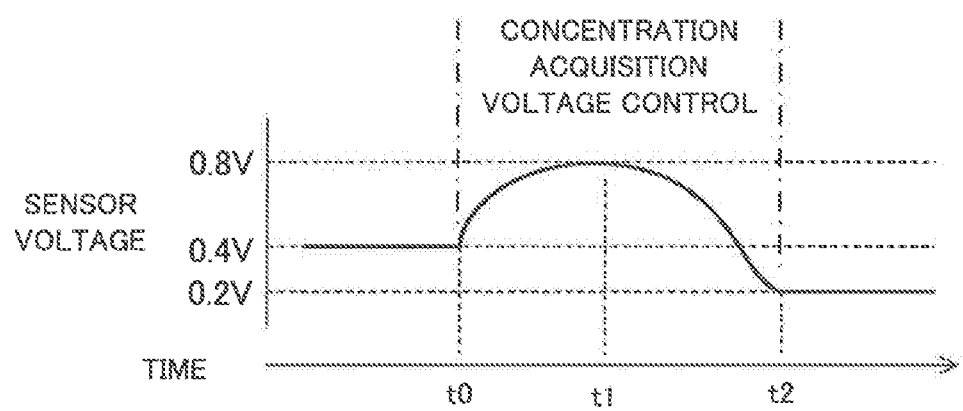
FIG. 7 is a view for showing a time chart illustrating changes of the voltage applied to the sensor cell.

Accordingly, as shown in FIG. 7, the first embodiment apparatus executes a constant voltage control for controlling the sensor voltage Vss to maintain the sensor voltage Vss at a constant value lower than the oxygen increasing voltage Vox_in when the exhaust SOx concentration is not requested to be acquired, that is, in a time period before a point of time t0. In this embodiment, the constant value lower than the oxygen increasing voltage Vox_in is 0.4 V.

When the exhaust SOx concentration is requested to be acquired and an engine operation (that is, an operation of the engine 50) is in a steady operation state or an idling operation state, the first embodiment apparatus executes a concentration acquisition voltage control including a decomposition voltage increasing control and a reoxidation voltage decreasing control described below.

The exhaust SOx concentration is requested to be acquired, for example, when a vehicle equipped with the engine 50 moves for a predetermined distance after fuel is supplied to a fuel tank which stores the fuel to be supplied to the fuel injectors 54. Alternatively, the exhaust SOx concentration is requested to be acquired when the vehicle equipped with the engine 50 moves for the predetermined distance after the fuel is supplied to the fuel tank and thereafter, the exhaust SOx concentration is requested to be acquired each time the vehicle moves for the predetermined distance or another predetermined distance.

The steady operation state is a state that the engine speed NE and the engine load KL are constant or generally constant, respectively. That is, when the engine operation is in the steady operation state, a concentration of the oxygen included in the exhaust gas just discharged from the engine 50 is constant or generally constant. Hereinafter, the concentration of the oxygen included in the exhaust gas just discharged from the engine 50 will be referred to as "the exhaust oxygen concentration". The idling operation state is a state that the operation amount AP of the acceleration pedal is zero and thus, a minimum amount of the air required to maintain the operation of the engine 50 is caused to flow into the combustion chambers 53, and the fuel injectors 54 are caused to inject the fuel. Therefore, the exhaust oxygen concentration is constant or generally constant when the engine operation is in the idling operation state.

When the first embodiment apparatus starts to execute the concentration acquisition voltage control, the first embodiment apparatus starts to execute the decomposition voltage increasing control for increasing the sensor voltage Vss from 0.4 V with an increasing rate of the sensor voltage Vss decreasing gradually (see the point of time t0 in FIG. 7). When the sensor voltage Vss reaches the increasing end voltage Vup_end (in this embodiment, 0.8 V), the first embodiment apparatus stops executing the decomposition voltage increasing control (see a point of time t1 in FIG. 7). Thereby, the first embodiment apparatus increases the sensor voltage Vss from 0.4 V to 0.8 V.

Thereafter, the first embodiment apparatus starts to execute the reoxidation voltage decreasing control for decreasing the sensor voltage Vss from the increasing end voltage Vup_end (in this embodiment, 0.8 V) with a decreasing rate of the sensor voltage Vss increasing gradually (seethe point of time t1 in FIG. 7). When the sensor voltage Vss reaches the decreasing end voltage Vdown_end (in this embodiment, 0.2 V), the first embodiment apparatus stops executing the reoxidation voltage decreasing control (see a point of time t2 in FIG. 7). Thereby, the first embodiment apparatus decreases the sensor voltage Vss from 0.8 V to 0.2 V.

In this embodiment, the first embodiment apparatus changes the sensor voltage Vss in the decomposition voltage increasing control such that a period of time from a point of time of starting to increase the sensor voltage Vss to a point of time of stopping increasing the sensor voltage Vss, is 0.1 seconds (=100 ms). In this connection, the period of time from the point of time of starting to increase the sensor voltage Vss to the point of time of stopping increasing the sensor voltage Vss in the decomposition voltage increasing control of the first embodiment, is not limited to 0.1 seconds.

Further, in this embodiment, the first embodiment apparatus changes the sensor voltage Vss in the reoxidation voltage decreasing control such that a period of time from a point of time of starting to decrease the sensor voltage Vss to a point of time of stopping decreasing the sensor voltage Vss, is 0.1 seconds (=100 ms). In this connection, the first embodiment apparatus may be configured to change the sensor voltage Vss in the reoxidation voltage decreasing control such that the period of time from the point of time of starting to decrease the sensor voltage Vss to the point of time of stopping decreasing the sensor voltage Vss, corresponds to a period of time longer than 0.1 seconds and equal to or shorter than 5 seconds.

The first embodiment apparatus acquires the sensor current Iss as the base current Ibase when the sensor voltage Vss reaches the oxygen decreasing voltage Vox_de (in this embodiment, 0.6 V) while the first embodiment apparatus executes the reoxidation voltage decreasing control.

Further, the first embodiment apparatus acquires the sensor current Iss as a SOx concentration current Iss_sox(n) each time the sensor voltage Vss decreases by a predetermined value while the first embodiment apparatus decreases the sensor voltage Vss to the voltage decreasing end voltage Vdown_end (in this embodiment, 0.2 V) after the sensor voltage Vss reaches the oxygen decreasing voltage Vox_de. In addition, the first embodiment apparatus stores the acquired SOx concentration currents Iss_sox(n) in the RAM in association with the sensor voltage Vss(n) at a point of time when the first embodiment apparatus acquires each of the SOx concentration currents Iss_sox(n).

The first embodiment apparatus may be configured to acquire the sensor current Iss as the SOx concentration current Iss_sox(1) when the sensor voltage Vss reaches the oxygen decreasing voltage Vox_de and then, acquire the sensor current Iss as the SOx concentration current Iss_sox(n) each time a predetermined time elapses.

Then, the first embodiment apparatus acquires the integration value S11 of the differences dIss(n) between each of the SOx concentration currents iss_sox(n) and the base current Ibase (dIss(n)=Ibase−Iss(n)).

The first embodiment apparatus applies the acquired integration value S11 to a look-up table Map11Csox(S11) to acquire the exhaust SOx concentration Csox. The look-up table Map11Csox(S11) is prepared previously on the basis of experiments, etc. for determining a relationship between the integration value S11 and the exhaust SOx concentration in the sensor 10. The exhaust SOx concentration Csox acquired from the look-up table Map11Csox(S11) increases as the integration value S11 increases. Hereinafter, the integration value S11 will be referred to as "the current difference integration value S11".

The first embodiment apparatus acquires the exhaust SOx concentration Csox, using the current difference integration value S11. As described above, the current difference integration value S11 is a value correlating with the exhaust SOx concentration. Therefore, the first embodiment apparatus can acquire the exhaust SOx concentration.

Further, the SOx concentration currents Iss_sox(n) are the sensor currents Iss subject to the oxidizing reaction of the sulfur component produced by the decomposing reaction of the SOx. In addition, the base current Ibase is the sensor current Iss acquired when the sensor voltage Vss reaches the oxygen decreasing voltage Vox_de. Therefore, the base current Ibase is the sensor current Iss subject to the oxidizing reaction of the sulfur component.

Therefore, the current difference integration value S11 is a value acquired by integrating the current differences dIss(n) which are differences between the base current Ibase subject to the oxidizing reaction of the sulfur component and each of the SOx concentration currents Iss_sox(n), respectively. Thus, the current difference integration value S11 is a value which includes no or almost no component of the sensor current Iss not subject to the oxidizing reaction of the sulfur component.

Accordingly, (1) the base current Ibase and the SOx concentration current Iss_sox(n) used for acquiring the current difference integration value S11 are currents subject to the oxidizing reaction of the sulfur component derived from the SOx, (2) the current difference dIss used for acquiring the current difference integration value S11 is a value which includes no or almost no component of the sensor current Iss not subject to the oxidizing reaction of the sulfur component, (3) the current difference integration value S11 is a value acquired using the SOx concentration currents Iss_sox(n).

Therefore, a change of the current difference integration value S11 when the exhaust SOx concentration changes, is larger than a change of the difference between the base current Ibase and the SOx concentration current Iss_sox when the exhaust SOx concentration changes in case that the sensor current not subject to the oxidizing reaction of the sulfur component is used as the base current Ibase. Thus, the current difference integration value S11 represents the change of the exhaust SOx concentration definitely. The first embodiment apparatus acquires the exhaust SOx concentration Csox, using the current difference integration value S11. Thus, the first embodiment apparatus can acquire the exhaust SOx concentration accurately.

Figure 8:
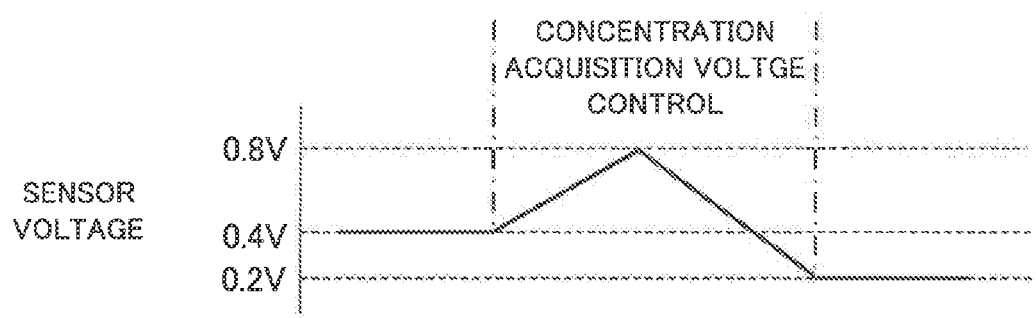
FIG. 8 is a view for showing manners of increasing and decreasing the voltage applied to the sensor cell by the SOx concentration acquiring apparatus according to the first embodiment.

As shown in FIG. 8, the first embodiment apparatus may be configured to increase the sensor voltage Vss from 0.4 V to 0.8 V in the decomposition voltage increasing control such that the increasing rate of the sensor voltage Vss is constant. In addition, as shown in FIG. 8, the first embodiment apparatus may be configured to decrease the sensor voltage Vss from 0.8 V to 0.2 V in the reoxidation voltage decreasing control such that the decreasing rate of the sensor voltage Vss is constant.

Further, the sensor voltage Vss at the point of time of starting to increase the sensor voltage Vss in the decomposition voltage increasing control, that is, the sensor voltage Vss applied to the sensor cell 15 in the constant voltage control, is not limited to 0.4 V. The sensor voltage Vss at the point of time of starting to increase the sensor voltage Vss in the decomposition voltage increasing control may be a voltage lower than the oxygen increasing voltage Vox_in. For example, the sensor voltage Vss at the point of time of starting to increase the sensor voltage Vss in the decomposition voltage increasing control, may be 0.2 V.

Further, the sensor voltage Vss at the point of time of stopping increasing the sensor voltage Vss in the decomposition voltage increasing control, that is, the increasing end voltage Vup_end, is not limited to 0.8 V. The sensor voltage Vss at the point of time of stopping increasing the sensor voltage Vss in the decomposition voltage increasing control, may be a voltage higher than the oxygen increasing voltage Vox_in.

Further, the sensor voltage Vss at the point of time of stopping decreasing the sensor voltage Vss in the reoxidation voltage decreasing control, that is, the voltage decreasing end voltage Vdown_end, is not limited to 0.2 V. The sensor voltage Vss at the point of time of stopping decreasing the sensor voltage Vss in the reoxidation voltage decreasing control, may be a voltage lower than the oxygen decreasing voltage Vox_de.

Further, the base current Ibase is not limited to the sensor current Iss when the sensor voltage Vss reaches the oxygen decreasing voltage Vox_de (in this embodiment, 0.6 V) while the first embodiment apparatus executes the reoxidation voltage decreasing control. The base current Ibase may be the sensor current Iss when the sensor voltage Vss reaches a voltage equal to or lower than the oxygen decreasing voltage Vox_de.

Further, if an influence of the oxygen included in the exhaust gas reaching the sensor cell 15 A to the sensor current Iss in the reoxidation voltage decreasing control, can be eliminated, the first embodiment apparatus may be configured to execute the concentration acquisition voltage control and acquire the exhaust SOx concentration Csox when the exhaust SOx concentration is requested to be acquired although the engine operation is not in any of the steady operation state and the idling operation state.

Further, the first embodiment apparatus acquires the exhaust SOx concentration Csox, using the current difference integration value S11. In this connection, the first embodiment apparatus may be configured to acquire the exhaust SOx concentration Csox, using a value correlating with the current difference integration value S11, for example, the current difference integration value S11 corrected by a correction coefficient.

<Acquisition of Exhaust Oxygen Concentration>

As understood referring to FIG. 3, in the sensor 10, there is a limiting current range which is a range of the sensor voltage Vss in which the sensor current Iss is constant, independently of the sensor voltage Vss when the exhaust oxygen concentration (i.e., the exhaust gas air-fuel ratio A/F) is constant. Therefore, the exhaust oxygen concentration (i.e., the exhaust gas air-fuel ratio A/F) can be acquired by using the sensor current Iss when a voltage within the limiting current range for the exhaust oxygen concentrations to be acquired, is applied to the sensor cell 15.

As described above, the first embodiment apparatus executes the constant voltage control for controlling the sensor voltage Vss to 0.4 V when the exhaust SOx concentration is not requested to be acquired. In this embodiment, the voltage of 0.4 V is the voltage within the limiting current range for the exhaust oxygen concentrations to be acquired.

Accordingly, the first embodiment apparatus acquires the sensor current Iss as an oxygen concentration current Iss_oxy while the first embodiment apparatus executes the constant voltage control. Then, the first embodiment apparatus applies the oxygen concentration current Iss_oxy to a look-up table MapCoxy(Iss_oxy), thereby acquiring the exhaust oxygen concentration Coxy.

The look-up table MapCoxy(Iss_oxy) is prepared previously on the basis of experiments, etc. for determining a relationship between the sensor current Iss and the exhaust oxygen concentration when the sensor voltage Vss is controlled to 0.4 V. The exhaust oxygen concentration Coxy acquired from the look-up table MapCoxy(Iss_oxy) increases as the oxygen concentration current Iss_oxy increases.

Thereby, the first embodiment apparatus can acquire the exhaust oxygen concentration as well as the exhaust SOx concentration.

It should be noted that the sensor voltage Vss applied in the constant voltage control is not limited to 0.4 V. The sensor voltage Vss applied in the constant voltage control may be a voltage in the limiting current range for the exhaust oxygen concentrations to be acquired.

Concrete Operation of First Embodiment Apparatus

Next, a concrete operation of the first embodiment apparatus will be described. The CPU of the ECU 90 of the first embodiment apparatus is configured or programmed to execute a routine shown in FIG. 9 each time a predetermined time elapses.

Figure 9:
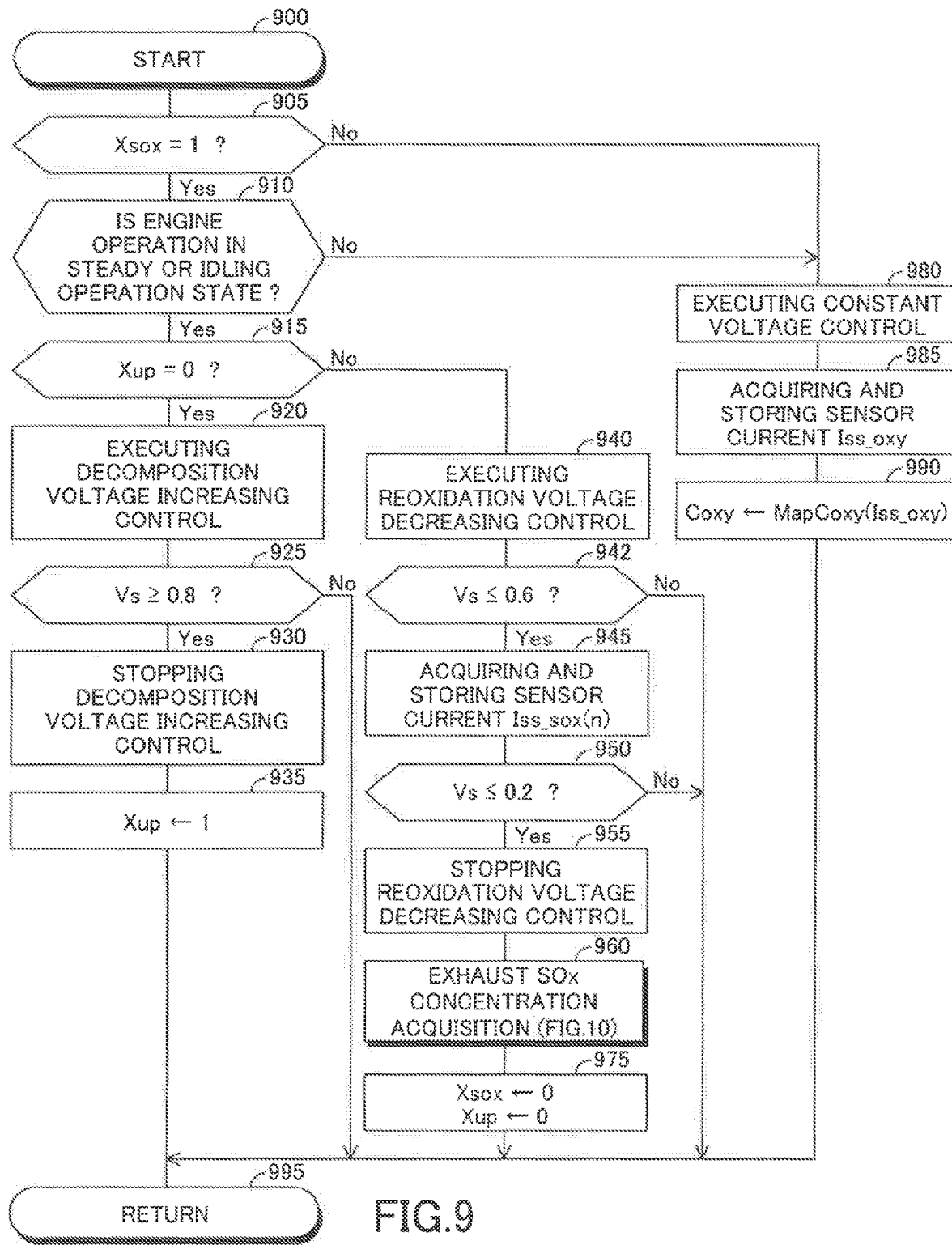
FIG. 9 is a view for showing a flowchart illustrating a routine executed by a CPU of an ECU of the SOx concentration acquiring apparatus according to the first embodiment.

Therefore, at a predetermined timing, the CPU starts a process from a step 900 in FIG. 9 and proceeds with the process to a step 905 to determine whether a value of a SOx concentration acquiring request flag Xsox is "1". The value of the SOx concentration acquiring request flag Xsox is set to "1" when the exhaust SOx concentration is requested to be acquired and is set to "0" when the exhaust SOx concentration is acquired.

When the value of the SOx concentration acquiring request flag Xsox is "1", the CPU determines "Yes" at the step 905 and then, proceeds with the process to a step 910 to determine whether the engine operation is in the steady operation state or the idling operation state.

When the engine operation is in the steady operation state or the idling operation state, the CPU determines "Yes" at the step 910 and then, proceeds with the process to a step 915 to determine whether a value of a voltage increasing end flag Xup is "0". The value of the voltage increasing end flag Xup is set to "1" when the decomposition voltage increasing control ends and is set to "0" when the reoxidation voltage decreasing control ends after the decomposition voltage increasing control ends. Immediately after the exhaust SOx concentration is requested to be acquired, the decomposition voltage increasing control has not been executed and thus, the value of the voltage increasing end flag Xup is "0".

When the value of the voltage increasing end flag Xup is "0" at a time of executing a process of the step 915, the CPU determines "Yes" at the step 915 and then, execute a process to a step 920 described below. Then, the CPU proceeds with the process to a step 925.

Step 920: The CPU starts to execute the decomposition voltage increasing control when the CPU has not executed the decomposition voltage increasing control. On the other hand, the CPU continues to execute the decomposition voltage increasing control when the CPU already executes the decomposition voltage increasing control. When the CPU executes the process of the step 920 immediately after the CPU first determines "Yes" at the step 915 after the exhaust SOx concentration Csox is requested to be acquired, the CPU has not executed the decomposition voltage increasing control. In this case, the CPU starts to execute the decomposition voltage increasing control. The CPU continues to execute the decomposition voltage increasing control until the CPU determines "Yes" at the step 925.

When the CPU proceeds with the process to the step 925, the CPU determines whether the sensor voltage Vss reaches 0.8 V, that is, the sensor voltage Vss is equal to or higher than 0.8 V. When the sensor voltage Vss is lower than 0.8 V, the CPU determines "No" at the step 925 and then, proceeds with the process to a step 995 to terminate this routine once.

On the other hand, when the sensor voltage Vss is equal to or higher than 0.8 V, the CPU determines "Yes" at the step 925 and then, executes processes of steps 930 and 935 described below. Then, the CPU proceeds with the process to the step 995 to terminate this routine once.

Step 930: The CPU stops executing the decomposition voltage increasing control.

Step 935: The CPU sets the value of the voltage increasing end flag Xup to "1". Thereby, when the CPU proceeds with the process to the step 915, the CPU determines "No" at the step 915.

When the value of the voltage increasing end flag Xup is "1" at a time of executing a process of the step 915, the CPU determines "No" at the step 915 and then, executes a process of a step 940 described below. Then, the CPU proceeds with the process to a step 942.

Step 940: The CPU starts to execute the reoxidation voltage decreasing control when the CPU has not executed the reoxidation voltage decreasing control. On the other hand, the CPU continues to execute the reoxidation voltage decreasing control when the CPU already executes the reoxidation voltage decreasing control. When the CPU executes the process of the step 940 immediately after the CPU first determines "No" at the step 915 after the exhaust SOx concentration Csox is requested to be acquired, the CPU has not executed the reoxidation voltage decreasing control. In this case, the CPU starts to execute the reoxidation voltage decreasing control. The CPU continues to execute the reoxidation voltage decreasing control until the CPU determines "Yes" at a step 950.

When the CPU proceeds with the process to the step 942, the CPU determines whether the sensor voltage Vss is equal to or lower than 0.6 V, that is, the sensor voltage Vss is equal to or lower than the oxygen decreasing voltage Vox_de. When the sensor voltage Vss is higher than 0.6 V, the CPU determines "No" at the step 942 and then, proceeds with the process to the step 995 to terminate this routine once.

On the other hand, when the sensor voltage Vss is equal to or lower than 0.6 V, the CPU determines "Yes" at the step 942 and then, executes a process of a step 945 described below. Then, the CPU proceeds with the process to the step 950.

Step 945: The CPU acquires the sensor current Iss and stores the acquired sensor current Iss as the SOx concentration current Iss_sox(n) in the RAM in association with the sensor voltage Vss corresponding to the acquisition of the sensor current Iss.

When the CPU proceeds with the process to the step 950, the CPU determines whether the sensor voltage Vss reaches 0.2 V, that is, the sensor voltage Vss is equal to or lower than 0.2 V. When the sensor voltage Vss is higher than 0.2 V, the CPU determines "No" at the step 950 and then, proceeds with the process to the step 995 to terminate this routine once.

On the other hand, when the sensor voltage Vss is equal to or lower than 0.2 V, the CPU determines "Yes" at the step 950 and then, executes processes of steps 955 to 975 described below. Then, the CPU proceeds with the process to the step 995 to terminate this routine once.

Step 955: The CPU stops executing the reoxidation voltage decreasing control.

Step 960: The CPU executes a routine shown by a flowchart in FIG. 10.

Therefore, when the CPU proceeds with the process to the step 960, the CPU starts a process from a step 1000 in FIG. 10 and then, executes processes of steps 1010 to 1040 described below. Then, the CPU proceeds with the process to the step 975 in FIG. 9 via a step 1095.

Step 1010: The CPU acquires the SOx concentration current Iss_sox(1) as the base current Ibase from the SOx concentration currents Iss_sox(n). The SOx concentration current Iss_sox(1) is the sensor current acquired when the sensor voltage Vss reaches 0.6 V, that is, the oxygen decreasing voltage Vox_de.

Step 1020: The CPU acquires the difference between the base current Ibase and each of the SOx concentration currents Iss_sox(n) as the current difference dIss(n) (=Ibase−Iss_sox(n)).

Step 1030: The CPU acquires the integration value of the current differences dIss(n) as the current difference integration value S11 (=Σ(dIss(n))).

Step 1040: The CPU applies the current difference integration value S11 to the look-up table Map11Csox(S11) to acquire the exhaust SOx concentration Csox.

When the CPU proceeds with the process to the step 975 in FIG. 9, the CPU sets the values of the SOx concentration acquisition request flag Xsox and the voltage increasing end flag Xup to "0", respectively.

When the value of the SOx concentration acquiring request flag Xsox is "0" at a time of executing a process of the step 905 in FIG. 9, and the engine operation is not in any of the steady operation state and the idling operation state at a time of executing a process of the step 910 in FIG. 9, the CPU determines "No" at any of the steps 905 and 910 and then, executes processes of steps 980 to 990. Then, CPU proceeds with the process to the step 995 to terminate this routine once.

Step 980: The CPU starts to execute the constant voltage control for controlling the sensor voltage Vss to 0.4 V when the CPU has not executed the constant voltage control. On the other hand, the CPU continues to execute the constant voltage control when the CPU already executes the constant voltage control.

Step 985: The CPU acquires the sensor current Iss and stores the acquired sensor current Iss as the oxygen concentration current Iss_oxy in the RAM.

Step 990: The CPU applies the oxygen concentration current Iss_oxy to the look-up table MapCoxy(Iss_oxy) to acquire the exhaust oxygen concentration Coxy.

The first embodiment apparatus can acquire the exhaust SOx concentration and the exhaust oxygen concentration by executing the routine shown in FIG. 9.

Further, when the exhaust SOx concentration is equal to or lower than an upper limit concentration Csox_limit designated by law but is near the upper limit concentration Csox_limit, it is desired to determine that the exhaust SOx concentration is near the upper limit concentration Csox_limit in order to inform that the exhaust SOx concentration is near the upper limit concentration Csox_limit.

Figure 10:
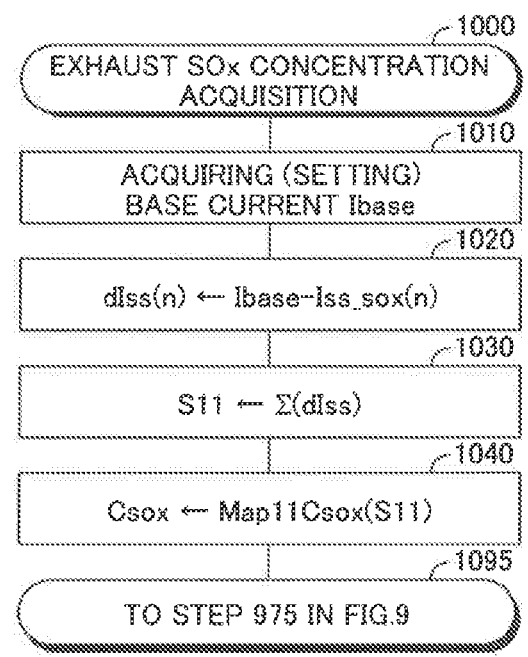
FIG. 10 is a view for showing a flowchart illustrating a routine executed by the CPU.
Figure 11:
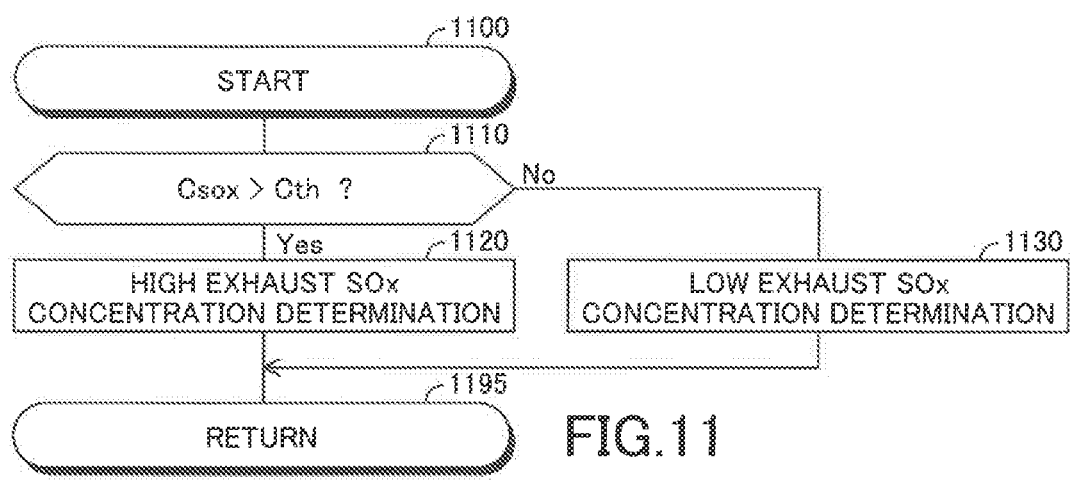
FIG. 11 is a view for showing a flowchart illustrating a routine executed by the CPU.

Accordingly, the CPU of the ECU 90 of the first embodiment apparatus is configured or programmed to execute a routine shown by a flowchart in FIG. 11 each time a predetermined time elapses. Therefore, at a predetermined timing, the CPU starts a process from a step 1100 in FIG. 11 and proceeds with the process to a step 1110 to determine whether the exhaust SOx concentration Csox acquired at the step 1040 in FIG. 10 is larger than an upper limit concentration Cth. The upper limit concentration Cth is a permissible upper limit value of the exhaust SOx concentration.

When the exhaust SOx concentration Csox is larger than the upper limit concentration Cth, the CPU determines "Yes" at the step 1110 and then, proceeds with the process to a step 1120 to determine that the exhaust SOx concentration is larger than the upper limit concentration Cth. Then, the CPU proceeds with the process to a step 1195 to terminate this routine once.

On the other hand, when the exhaust SOx concentration Csox is equal to or smaller than the upper limit concentration Cth, the CPU determines "No" at the step 1110 and then, proceeds with the process to a step 1130 to determine that the exhaust SOx concentration is equal to or smaller than the upper limit concentration Cth. Then, the CPU proceeds with the process to the step 1195 to terminate this routine once.

The first embodiment apparatus can determine whether the exhaust SOx concentration is larger than the upper limit concentration by executing the routine shown in FIG. 11.

Modified Example of First Embodiment

Next, the SOx concentration acquiring apparatus of the internal combustion engine according to a modified example of the first embodiment will be described. Hereinafter, the SOx concentration acquiring apparatus according to the modified example of the first embodiment will be referred to as "the first modified apparatus".

<Summary of Operation of First Modified Apparatus>

As described above, the first embodiment apparatus uses the current difference dIss(n) in which the component of the sensor current Iss not subject to the oxidizing reaction of the sulfur component is eliminated. Thus, the first embodiment apparatus can acquire the exhaust SOx concentration accurately.

In this regard, an average change rate Rave of the sensor current Iss changing from a high voltage current Ihigh which is the sensor current Iss at the oxygen decreasing voltage Vox_de (in this embodiment, 0.6 V) to a low voltage current Ilow which is the sensor current Iss at the voltage decreasing end voltage Vdown_end (in this embodiment, 0.2 V), is generally equal to an average change rate of the sensor current Iss changing while the sensor voltage Vss decreases from the oxygen decreasing voltage Vox_de to the voltage decreasing end voltage Vdown_end when the exhaust SOx concentration is zero. In this embodiment, the low voltage current Ilow is 0.4 mA, and the high voltage current Ihigh is 0.42 mA.

Figure 12:
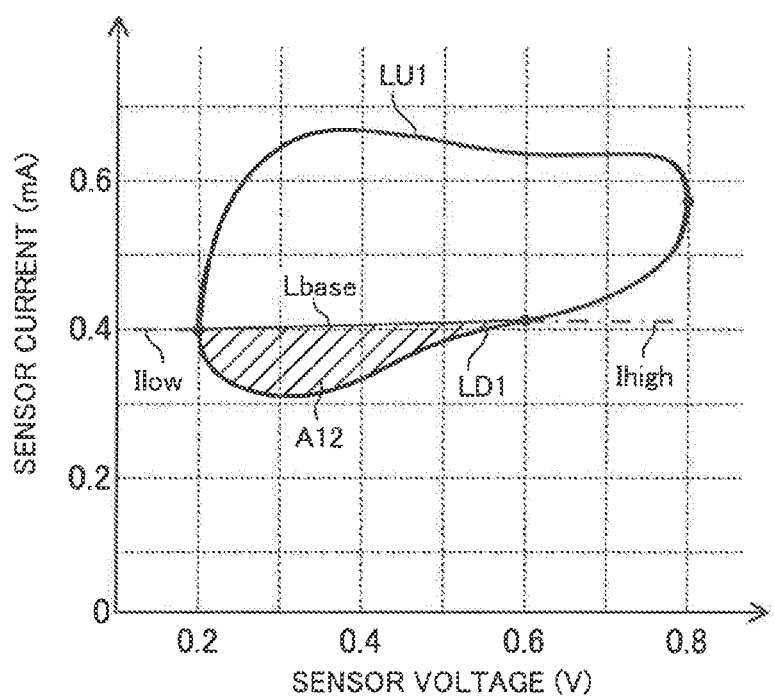
FIG. 12 is a view for showing a relationship between the voltage applied to the sensor cell of the limiting current sensor of the SOx concentration acquiring apparatus according to a modified example of the first embodiment and the current flowing through the sensor cell of the modified example.

Therefore, when currents at the sensor voltages Vss(n), at which the SOx concentration currents iss_sox(n) are acquired, are acquired as the base currents Ibase(n) from currents changing from the high-voltage current Ihigh at the average change rate Rave, that is, currents on a line shown by a reference sign Lbase in FIG. 12, and differences between each of the base currents Ibase(n) at the sensor voltages Vss(n), at which the SOx concentration currents Iss_sox(n), and each of the SOx concentration currents Iss_sox(n) are acquired as current differences dIss(n), each of the current differences dIss(n) is a value in which component of the sensor current Iss not subject to the oxidizing reaction of the sulfur component is eliminated to a large extent, compared with the current differences dIss(n) acquired by the first embodiment apparatus.

Thus, the exhaust SOx concentration Csox can be acquired more accurately by acquiring the exhaust SOx concentration Csox on the basis of the integration value S12 of the current differences dIss(n). In this case, the integration value S12 corresponds to an area shown by a reference sign A12 in FIG. 12.

Accordingly, the first modified apparatus executes a preliminary voltage control including a preliminary voltage increasing control and a preliminary voltage decreasing control when the exhaust SOx concentration is requested to be acquired, and the engine operation is in any of the steady operation state and the idling operation state.

When the first modified apparatus starts to execute the preliminary voltage control, the first modified apparatus executes a voltage increasing preparation control for decreasing the sensor voltage Vss from 0.4 V. In this regard, the first modified apparatus acquires the sensor current Iss as the reference current Iref (in this embodiment, 0.5 mA) when the sensor voltage Vss is controlled to 0.4 V. Then, the first embodiment apparatus stops executing the voltage increasing preparation control when the sensor voltage Vss reaches 0.2 V.

Figure 13:
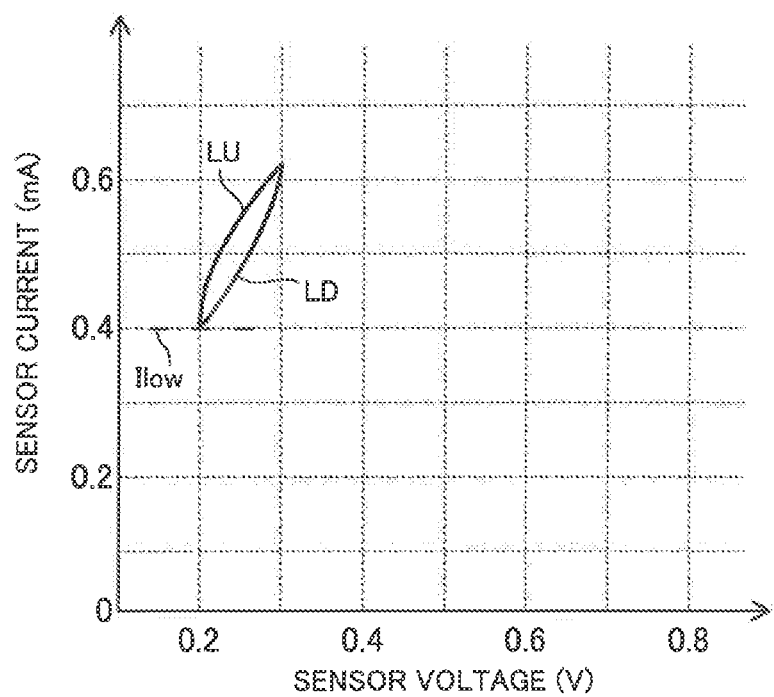
FIG. 13 is a view for showing a relationship between the voltage applied to the sensor cell of the modified example and the current flowing through the sensor cell of the modified example.

When the first modified apparatus stops executing the voltage increasing preparation control, the first modified apparatus executes the preliminary voltage increasing control for increasing the sensor voltage Vss from 0.2 V. The first modified apparatus stops executing the preliminary voltage increasing control when the sensor voltage Vss reaches 0.3 V. The sensor current Iss changes as shown by a line LU in FIG. 13 while the preliminary voltage increasing control is executed.

When the first modified apparatus stops executing the preliminary voltage increasing control, the first modified apparatus executes the preliminary voltage decreasing control for decreasing the sensor voltage Vss from 0.3 V. When the sensor voltage Vss reaches 0.2 V, the first modified apparatus stops executing the preliminary voltage decreasing control. Thus, the first modified apparatus stops executing the preliminary voltage control. The sensor current Iss changes as shown by a line LD in FIG. 13 while the first modified apparatus executes the preliminary voltage decreasing control. The first modified apparatus acquires the sensor current Iss as the low-voltage current Ilow when the first modified apparatus stops executing the preliminary voltage decreasing control, that is, the sensor voltage Vss reaches 0.2 V.

When the first modified apparatus stops executing the preliminary voltage control, the first modified apparatus executes the concentration acquisition voltage control. When the first embodiment apparatus starts to execute the concentration acquisition voltage control, the first modified apparatus executes the decomposition voltage increasing control for increasing the sensor voltage Vss from 0.2 V. When the sensor voltage Vss reaches 0.8 V, the first modified apparatus stops executing the decomposition voltage increasing control.

When the first modified apparatus stops executing the decomposition voltage increasing control, the first modified apparatus executes the reoxidation voltage decreasing control for decreasing the sensor voltage Vss from 0.8 V. When the sensor voltage Vss reaches 0.2 V, the first modified apparatus stops executing the reoxidation voltage decreasing control. The first modified apparatus acquires the sensor current Iss as the SOx concentration current Iss_sox(n) each time the sensor voltage Vss decreases by a predetermined value while the sensor voltage Vss decreases from 0.6 V to 0.2 V. The first modified apparatus stores the acquired SOx concentration currents Iss_sox(n) in the RAM in association with the sensor voltages Vss(n), at which the SOx concentration currents Iss_sox(n) are acquired.

Figure 14A:
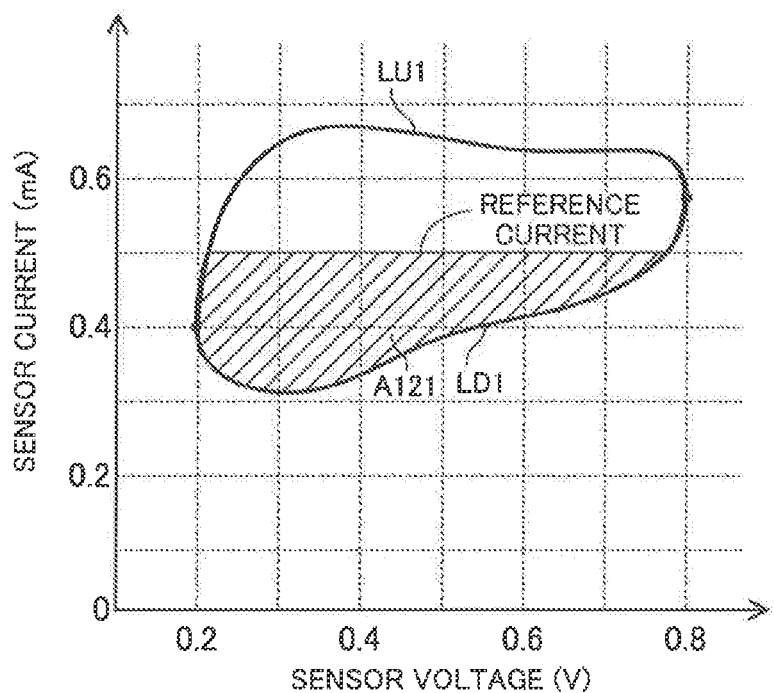
FIG. 14A is a view for showing a relationship between the voltage applied to the sensor cell of the modified example and the current flowing through the sensor cell of the modified example.

The first modified apparatus acquires an integration value of differences between the reference current Iref and each of the SOx concentration currents Iss_sox(n) as a first integration value S121 (=Σ(Iref−Iss_sox(n))). The first integration value S121 corresponds to an area shown by a reference sign A121 in FIG. 14A.

Further, the first modified apparatus acquires the sensor current Iss as the high-voltage current Ihigh when the sensor voltage Vss reaches the oxygen decreasing voltage Vox_de (in this embodiment, 0.6 V) while the first modified apparatus executes the reoxidation voltage decreasing control. The first modified apparatus acquires an average change rate of the sensor current Iss as a base current change rate R while the sensor current Iss decreases from the high-voltage current Ihigh to the low-voltage current Ilow. The first modified apparatus acquires currents at the sensor voltages Vss(n), at which the SOx concentration currents Iss_sox(n) are acquired, as base currents Ibase(n) from the currents changing from the high-voltage current Ihigh at the base current change rate R.

Figure 14B:
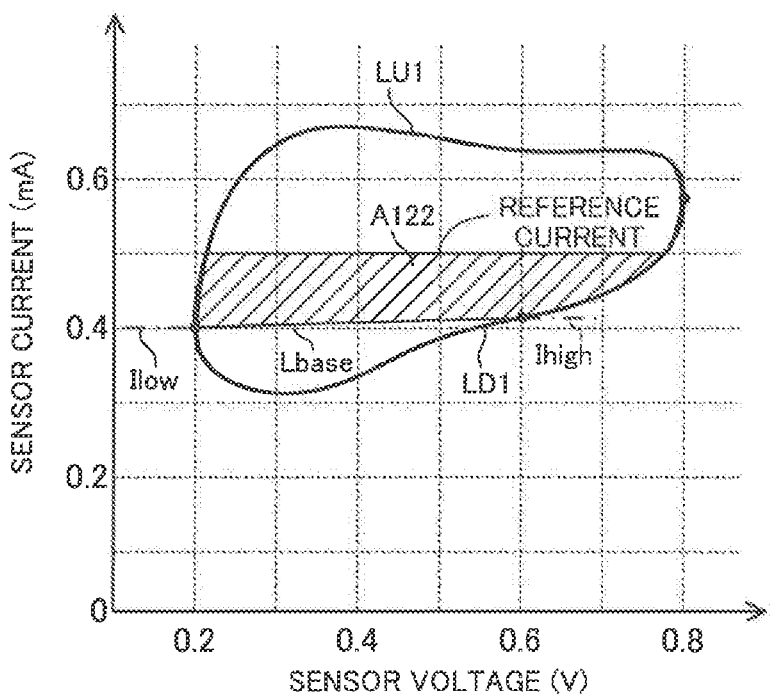
FIG. 14B is a view for showing a relationship between the voltage applied to the sensor cell of the modified example and the current flowing through the sensor cell of the modified example.

The first modified apparatus acquires an integration value of differences between the reference current Iref and each of the base currents Ibase(n) as a second integration value S122 (=Σ(Iref−Ibase(n))). The second integration value S122 corresponds to an area shown by a reference sign A122 in FIG. 14B.

The first modified apparatus subtracts the second integration value S122 from the first integration value S121, thereby acquiring a current difference integration value S12 (=S121−S122).

In particular, the first modified apparatus acquires differences between each of the base currents Ibase(n) and each of the SOx concentration currents Iss_sox(n) as the current differences dIss(n) by the method described above. The first modified apparatus acquires the integration value of the current differences dIss(n) as the current difference integration value S12.

The first modified apparatus applies the current difference integration value S12 to a look-up table Map12Csox(S12), thereby acquiring the exhaust SOx concentration Csox. The look-up table Map12Csox(S12) is prepared previously on the basis of experiments, etc. for determining a relationship between the current difference integration value S12 and the exhaust SOx concentration in the sensor 10. The exhaust SOx concentration Csox acquired from the look-up table Map12Csox(S12) increases as the current difference integration value S12 increases.

The first modified apparatus acquires the exhaust SOx concentration Csox, using the current difference integration value S12. The current difference integration value S12 is a value correlating with the exhaust SOx concentration. Therefore, the first modified apparatus can acquire the exhaust SOx concentration.

Further, the base current change rate R is a value near the change rate of the sensor current Iss changing after the sensor voltage Vss reaches the oxygen decreasing voltage Vox_de while the exhaust SOx concentration is zero. Therefore, the differences between each of the base currents Ibase(n) and each of the SOx concentration currents Iss_sox (n) are value in which components of the sensor current Iss not subject to the oxidizing reaction of the sulfur component are eliminated since the currents acquired on the basis of the base current change rate R is used as the base currents Ibase(n). Thus, the change rate of the current difference integration value S12 is larger than the change rate of the difference between the base current and the SOx concentration current Iss_sox acquired, using the current not subject to the oxidizing reaction of the sulfur component as the base current when the exhaust SOx concentration changes. Therefore, the current difference integration value S12 represents the change of the exhaust SOx concentration. Thus, the exhaust SOx concentration can be acquired accurately.

In the first modified example, the low-voltage current Ilow is lower than the high-voltage current Ihigh. In this regard, the first modified apparatus may be applied to a limiting current sensor in which the low-voltage current Ilow is larger than the high-voltage current Ihigh.

Further, when a large calculation load of the CPU of the ECU 90 of the first modified apparatus can be permitted, or the CPU has sufficient large calculation ability, the first modified apparatus may be configured to acquire the differences dIss(n) between each of the base currents Ibase(n) and each of the SOx concentration current Iss_sox(n) directly and integrate the differences dIss(n) to acquire the current difference integration value S12.

Further, the first modified apparatus executes the preliminary voltage control before the first modified apparatus executes the concentration acquisition voltage control. In this regard, the first modified apparatus may be configured to execute the preliminary voltage control after the first modified apparatus executes the concentration acquisition voltage control. However, in this case, the first sensor electrode 15A may be subject to the decomposing reaction of the SOx and the oxidizing reaction of the sulfur component occurring during the concentration acquisition voltage control when the first modified apparatus executes the preliminary voltage control. Therefore, preferably, the first modified apparatus executes the preliminary voltage control before the first modified apparatus executes the concentration acquisition voltage control.

Furthermore, the first modified apparatus acquires the sensor current Iss as the low-voltage current Ilow when the sensor voltage Vss reaches the voltage decreasing end voltage Vdown_end (in this example, 0.2 V). In this regard, the first modified apparatus may be configured to acquire the sensor current Iss as the low-voltage current Ilow when the sensor voltage Vss reaches a voltage other than the voltage decreasing end voltage Vdown_end. For example, the first modified apparatus may be configured to acquire the sensor current Iss as the low-voltage current Ilow when the sensor voltage Vss reaches a voltage lower than the oxygen decreasing voltage Vox_de.

Further, the first modified apparatus acquires the sensor current Iss as the high-voltage current Ihigh when the sensor voltage Vss reaches the oxygen decreasing voltage Vox_de (in this example, 0.6 V). In this regard, the first modified apparatus may be configured to acquire the sensor current Iss as the high-voltage current Ihigh when the sensor voltage Vss reaches a voltage other than the oxygen decreasing voltage Vox_de. For example, the first modified apparatus may be configured to acquire the sensor current Iss as the high-voltage current Ihigh when the sensor voltage Vss reaches a voltage higher than the sensor voltage Vss, at which the low-voltage current Iow is acquired, and equal to or lower than the oxygen decreasing voltage Vox_de.

Furthermore, the first modified apparatus acquires the sensor current Iss as the low-voltage current Ilow when the sensor voltage Vss reaches 0.2 V while the first modified apparatus executes the preliminary voltage decreasing control. In this regard, the first modified apparatus may be configured to acquire the sensor current Iss as the low-voltage current Ilow when the sensor voltage Vss reaches a voltage lower than the oxygen decreasing voltage Vox_de, in particular, the sensor voltage Vss reaches 0.2 V while the first modified apparatus executes the reoxidation voltage decreasing control without executing the preliminary voltage control.

Further, the first modified apparatus acquires the exhaust SOx concentration Csox, using the current difference integration value S12. In this regard, the first modified apparatus may be configured to acquire the exhaust SOx concentration Csox, using a value correlating with the current difference integration value S12, for example, using a value acquired by correcting the current difference integration value S12 by a correction coefficient.

<Concrete Operation of First Modified Apparatus>

Next, a concrete operation of the first modified apparatus will be described. The CPU of the ECU 90 of the first modified apparatus is configured or programmed to execute a routine shown in FIG. 15 each time a predetermined time elapses. Therefore, at a predetermined timing, the CPU starts a process from a step 1500 in FIG. 15 and proceeds with the process to a step 1510 to determine whether a value of a SOx concentration acquiring request flag Xsox is "1".

When the value of the SOx concentration acquiring request flag Xsox is "1", the CPU determines "Yes" at the step 1510 and then, proceeds with the process to a step 1515 to determine whether the engine operation is in the steady operation state or the idling operation state.

When the engine operation is in the steady operation state or the idling operation state, the CPU determines "Yes" at the step 1515 and then, proceeds with the process to a step 1520 to determine whether a value of a preliminary voltage control end flag Xalt is "0". The value of the preliminary voltage control end flag Xalt is set to "1" when the preliminary voltage control ends and is set to "0" when the concentration acquisition voltage control ends after the preliminary voltage control ends. Immediately after the exhaust SOx concentration is requested to be acquired, the preliminary voltage control has not been executed and thus, the value of the preliminary voltage control end flag Xalt is "0".

Figure 16:
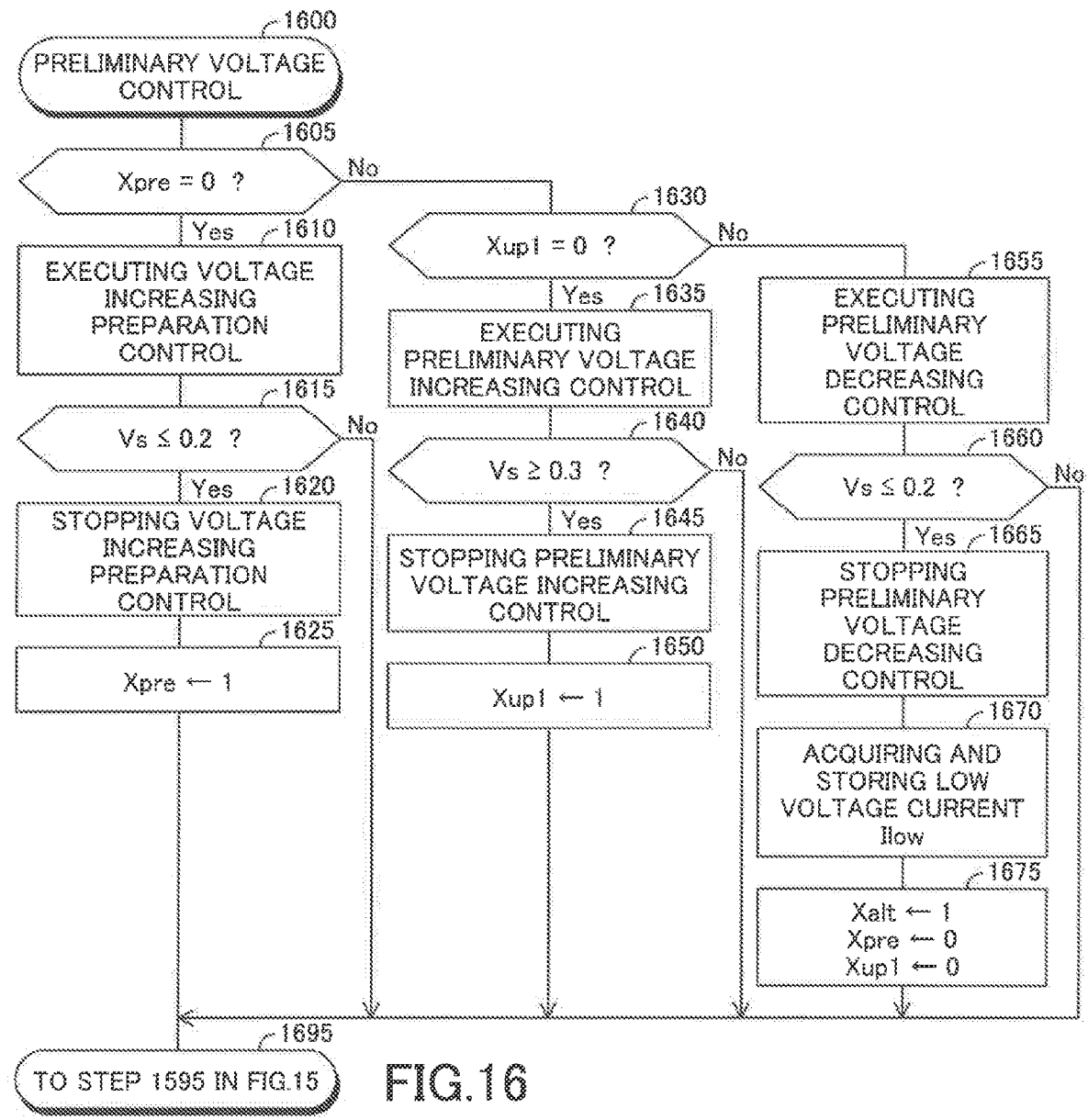
FIG. 16 is a view for showing a flowchart illustrating a routine executed by the CPU of the modified example.

When the value of the preliminary voltage control end flag Xalt is "0" at a time of executing a process of the step 1520, the CPU determines "Yes" at the step 1520 and then, proceeds with the process to a step 1530 to execute a routine shown by a flowchart in FIG. 16.

Therefore, when the CPU proceeds with the process to the step 1530 in FIG. 15, the CPU starts a process from a step 1600 in FIG. 16 and then, proceeds with the process to a step 1605 to determine whether a value of a preparation end flag Xpre is "0". The value of the preparation end flag Xpre is set to "1" when the voltage increasing preparation control ends and is set to "0" when the preliminary voltage decreasing control ends after the voltage increasing preparation control ends.

When the value of the preparation end flag Xpre is "0" at a time of executing a process of the step 1605, the CPU determines "Yes" at the step 1605 and then, executes a process of a step 1610 described below. Then, the CPU proceeds with the process to a step 1615.

Step 1610: The CPU starts to execute the voltage increasing preparation control when the CPU has not executed the voltage increasing preparation control. On the other hand, the CPU continues to execute the voltage increasing preparation control when the CPU already executes the voltage increasing preparation control. When the CPU executes the process of the step 1610 immediately after the CPU first determines "Yes" at the step 1605, the CPU has not executed the voltage increasing preparation control. In this case, the CPU starts to execute the voltage increasing preparation control. The CPU continues to execute the voltage increasing preparation control until the CPU determines "Yes" at the step 1615.

When the CPU proceeds with the process to the step 1615, the CPU determines whether the sensor voltage Vss reaches 0.2 V, that is, the sensor voltage Vss is equal to or lower than 0.2 V. When the sensor voltage Vss is higher than 0.2 V, the CPU determines "No" at the step 1615 and then, proceeds with the process to a step 1595 in FIG. 15 via a step 1695 to terminate this routine once.

On the other hand, when the sensor voltage Vss is equal to or lower than 0.2 V, the CPU determines "Yes" at the step 1615 and then, executes processes of steps 1620 and 1625 described below. Then, the CPU proceeds with the process to the step 1595 in FIG. 15 via the step 1695 to terminate this routine once.

Step 1620: The CPU stops executing the voltage increasing preparation control.

Step 1625: The CPU sets the value of the preparation end flag Xpre to "1". Thereby, when the CPU proceeds with the process to the step 1605, the CPU determines "No" at the step 1605.

When the value of the preparation end flag Xpre is "1" at a time of executing a process of the step 1605, the CPU determines "No" at the step 1605 and then, proceeds with the process to a step 1630 to determine whether a value of a voltage increasing end flag Xup1 is "0". The value of the voltage increasing end flag Xup1 is set to "1" when the preliminary voltage increasing control ends and is set to "0" when the preliminary voltage decreasing control ends after the preliminary voltage increasing control ends.

When the value of the voltage increasing end flag Xup1 is "0" at a time of executing a process of the step 1630, the CPU determines "Yes" at the step 1630 and then, execute a process to a step 1635 described below. Then, the CPU proceeds with the process to a step 1640.

Step 1635: The CPU starts to execute the preliminary voltage increasing control when the CPU has not executed the preliminary voltage increasing control. On the other hand, the CPU continues to execute the preliminary voltage increasing control when the CPU already executes the preliminary voltage increasing control. When the CPU executes the process of the step 1635 immediately after the CPU first determines "Yes" at the step 1630, the CPU has not executed the preliminary voltage increasing control. In this case, the CPU starts to execute the preliminary voltage increasing control. The CPU continues to execute the preliminary voltage increasing control until the CPU determines "Yes" at the step 1640.

When the CPU proceeds with the process to the step 1640, the CPU determines whether the sensor voltage Vss reaches 0.3 V, that is, the sensor voltage Vss is equal to or higher than 0.3 V. When the sensor voltage Vss is lower than 0.3 V, the CPU determines "No" at the step 1640 and then, proceeds with the process to the step 1595 in FIG. 15 via the step 1695 to terminate this routine once.

On the other hand, when the sensor voltage Vss is equal to or higher than 0.3 V, the CPU determines "Yes" at the step 1640 and then, executes processes of steps 1645 and 1650 described below. Then, the CPU proceeds with the process to the step 1595 in FIG. 15 via the step 1695 to terminate this routine once.

Step 1645: The CPU stops executing the preparation voltage increasing control.

Step 1650: The CPU sets the value of the voltage increasing end flag Xup1 to "1". Thereby, when the CPU proceeds with the process to the step 1630, the CPU determines "No" at the step 1630.

When the value of the voltage increasing end flag Xup1 is "1" at a time of executing a process of the step 1630, the CPU determines "No" at the step 1630 and then, executes a process of a step 1655 described below. Then, the CPU proceeds with the process to a step 1660.

Step 1655: The CPU starts to execute the preliminary voltage decreasing control when the CPU has not executed the preliminary voltage decreasing control. On the other hand, the CPU continues to execute the preliminary voltage decreasing control when the CPU already executes the preliminary voltage decreasing control. When the CPU executes the process of the step 1655 immediately after the CPU first determines "No" at the step 1630, the CPU has not executed the preliminary voltage decreasing control. In this case, the CPU starts to execute the preliminary voltage decreasing control. The CPU continues to execute the preliminary voltage decreasing control until the CPU determines "Yes" at the step 1660.

When the CPU proceeds with the process to the step 1660, the CPU determines whether the sensor voltage Vss reaches 0.2 V, that is, the sensor voltage Vss is equal to or lower than 0.2 V. When the sensor voltage Vss is higher than 0.2 V, the CPU determines "No" at the step 1660 and then, proceeds with the process to the step 1555 in FIG. 15 via the step 1695 to terminate this routine once.

On the other hand, when the sensor voltage Vss is equal to or lower than 0.2 V, the CPU determines "Yes" at the step 1660 and then, executes processes of steps 1665 to 1675 described below. Then, the CPU proceeds with the process to the step 1595 in FIG. 15 via the step 1695 to terminate this routine once.

Step 1665: The CPU stops executing the preliminary voltage decreasing control.

Step 1670: The CPU acquires the SOx concentration current Iss and stores the acquired SOx concentration current Iss as the low-voltage current Ilow in the RAM Step 1675: The CPU sets the value of the preliminary voltage control end flag Xalt to "1". Thereby, when the CPU proceeds with the process to the step 1520 in FIG. 15, the CPU determines "No" at the step 1520. Further, the CPU sets the values of the preparation end flag Xpre and the voltage increasing end flag Xup1 to "0", respectively.

Figure 17:
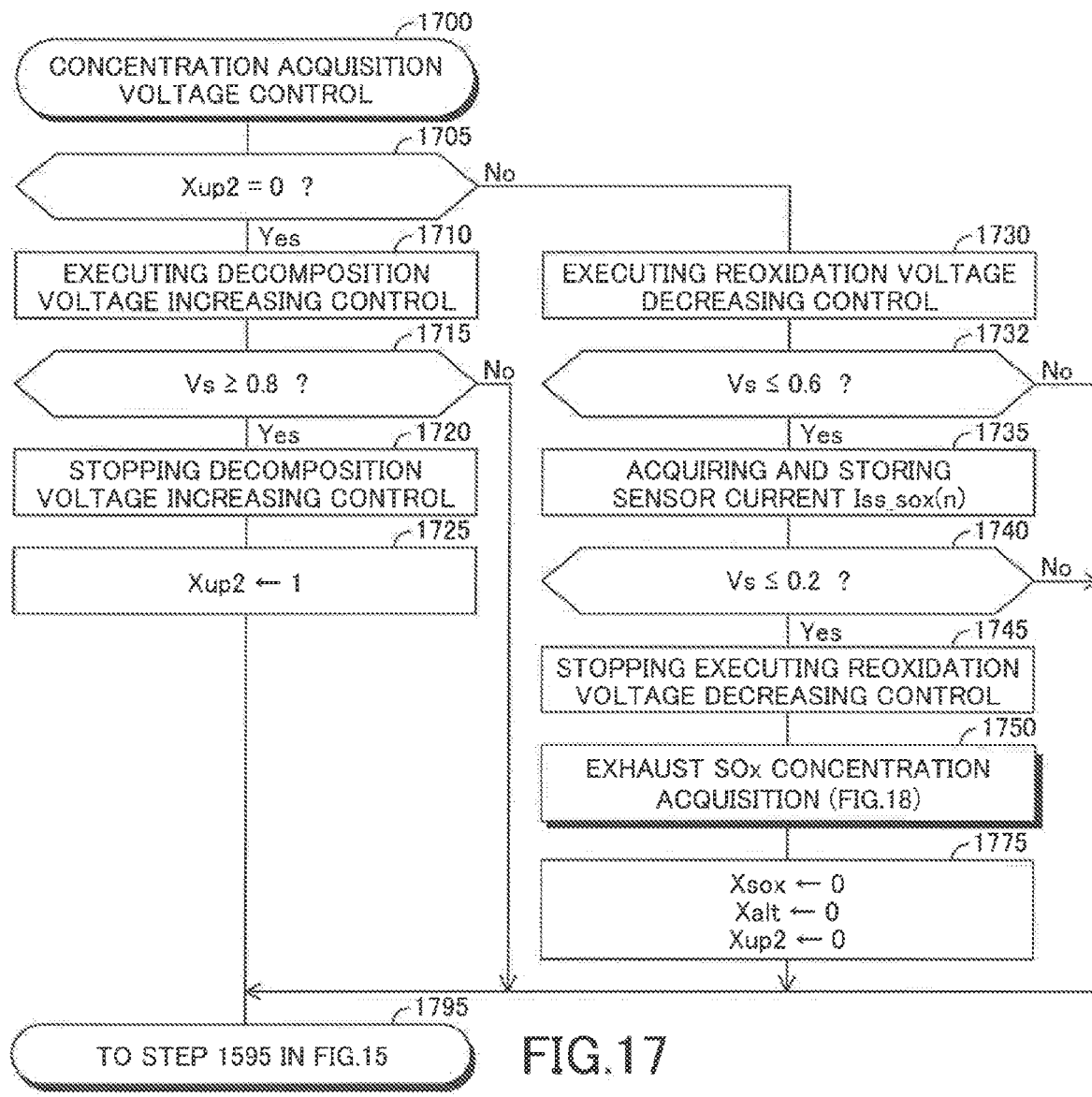
FIG. 17 is a view for showing a flowchart illustrating a routine executed by the CPU of the modified example.

When the value of the preliminary voltage control end flag Xalt is "1" at a time of executing a process of the step 1520 in FIG. 15, the CPU determines "No" at the step 1520 and then, proceeds with the process to a step 1540 to execute a routine shown by a flowchart in FIG. 17.

Therefore, when the CPU proceeds with the process to the step 1540, the CPU starts a process from a step 1700 in FIG. 17 and then, proceeds with the process to a step 1705 to determine whether a value of a voltage increasing end flag Xup2 is "0". The value of the voltage increasing end flag Xup2 is set to "1" when the decomposition voltage increasing control ends and is set to "0" when the reoxidation voltage decreasing control ends after the decomposition voltage increasing control ends.

When the value of the voltage increasing end flag Xup2 is "0" at a time of executing a process of the step 1705, the CPU determines "Yes" at the step 1705 and then, execute a process to a step 1710 described below. Then, the CPU proceeds with the process to a step 1715.

Step 1710: The CPU starts to execute the decomposition voltage increasing control when the CPU has not executed the decomposition voltage increasing control. On the other hand, the CPU continues to execute the decomposition voltage increasing control when the CPU already executes the decomposition voltage increasing control. When the CPU executes the process of the step 1710 immediately after the CPU first determines "Yes" at the step 1705, the CPU has not executed the decomposition voltage increasing control. In this case, the CPU starts to execute the decomposition voltage increasing control. The CPU continues to execute the decomposition voltage increasing control until the CPU determines "Yes" at the step 1715.

When the CPU proceeds with the process to the step 1715, the CPU determines whether the sensor voltage Vss reaches 0.8 V, that is, the sensor voltage Vss is equal to or higher than 0.8 V. When the sensor voltage Vss is lower than 0.8 V, the CPU determines "No" at the step 1715 and then, proceeds with the process to the step 1595 in FIG. 15 via a step 1795 to terminate this routine once.

On the other hand, when the sensor voltage Vss is equal to or higher than 0.8 V, the CPU determines "Yes" at the step 1715 and then, executes processes of steps 1720 and 1725 described below. Then, the CPU proceeds with the process to the step 1595 in FIG. 15 via the step 1795 to terminate this routine once.

Step 1720: The CPU stops executing the decomposition voltage increasing control.

Step 1725: The CPU sets the value of the voltage increasing end flag Xup2 to "1". Thereby, when the CPU proceeds with the process to the step 1705, the CPU determines "No" at the step 1705.

When the value of the voltage increasing end flag Xup2 is "1" at a time of executing a process of the step 1705, the CPU determines "No" at the step 1705 and then, executes a process of a step 1730 described below. Then, the CPU proceeds with the process to a step 1732.

Step 1730: The CPU starts to execute the reoxidation voltage decreasing control when the CPU has not executed the reoxidation voltage decreasing control. On the other hand, the CPU continues to execute the reoxidation voltage decreasing control when the CPU already executes the reoxidation voltage decreasing control. When the CPU executes the process of the step 1730 immediately after the CPU first determines "No" at the step 1705, the CPU has not executed the reoxidation voltage decreasing control. In this case, the CPU starts to execute the reoxidation voltage decreasing control. The CPU continues to execute the reoxidation voltage decreasing control until the CPU determines "Yes" at the step 1740.

When the CPU proceeds with the process to the step 1732, the CPU determines whether the sensor voltage Vss is equal to or lower than 0.6 V. When the sensor voltage Vss is higher than 0.6 V, the CPU determines "No" at the step 1732 and then, proceeds with the process to the step 1595 in FIG. 15 via the step 1795 to terminate this routine once.

On the other hand, when the sensor voltage Vss is equal to or lower than 0.6 V, the CPU determines "Yes" at the step 1732 and then, executes a process of a step 1735 described below. Then, the CPU proceeds with the process to a step 1740.

Step 1735: The CPU acquires the sensor current Iss and stores the acquired sensor current Iss as the SOx concentration current Iss_sox(n) in the RAM in association with the sensor voltage Vss corresponding to the acquisition of the sensor current Iss.

When the CPU proceeds with the process to the step 1740, the CPU determines whether the sensor voltage Vss reaches 0.2 V, that is, the sensor voltage Vss is equal to or lower than 0.2 V. When the sensor voltage Vss is higher than 0.2 V, the CPU determines "No" at the step 1740 and then, proceeds with the process to the step 1595 in FIG. 15 via the step 1795 to terminate this routine once.

On the other hand, when the sensor voltage Vss is equal to or lower than 0.2 V, the CPU determines "Yes" at the step 1740 and then, executes processes of steps 1745 to 1775 described below. Then, the CPU proceeds with the process to the step 1595 in FIG. 15 via the step 1795 to terminate this routine once.

Step 1745: The CPU stops executing the reoxidation voltage decreasing control.

Step 1750: The CPU executes a routine shown by a flowchart in FIG. 18.

Therefore, when the CPU proceeds with the process to the step 1750, the CPU starts a process from a step 1800 in FIG. 18 and then, executes processes of steps 1805 to 1840 described below.

Step 1805: The CPU acquires, as the reference current Iref, the sensor current Iss acquired and stored in the RAM at a step 1560 described later immediately before the CPU determines "Yes" at the step 1515 in FIG. 15 after the exhaust SOx concentration Csox is requested to be acquired.

Step 1810: The CPU acquires the SOx concentration current Iss_sox(1) from the SOx concentration currents Iss_sox(n) as the high-voltage current Ihigh. The SOx concentration current Iss_sox(1) is the sensor current acquired when the sensor voltage Vss reaches 0.6 V, that is, the oxygen decreasing voltage Vox_de.

Step 1815: The CPU acquires, as the base current change rate R, the change rate of the sensor current Iss changing while the sensor current Iss changes from the high-voltage current Ihigh to the low-voltage current Ilow.

Step 1820: The CPU acquires, as the base currents Ibase(n), the currents at the sensor voltages Vss(n), at which the SOx concentration currents Iss_sox(n), from the currents changing from the high-voltage current Ihigh at the base current change rate R.

Step 1825: The CPU acquires, as the first integration value S121 (=Σ(Iref−Iss_sox(n))), the integration value of the differences between the reference current Iref and each of the SOx concentration currents Iss_sox(n).

Step 1830: The CPU acquires, as the second integration value S122 (=Σ(Iref−Ibase(n)), the integration value of the differences between the reference current Iref and each of the base currents Ibase(n).

Step 1835: The CPU subtracts the second integration value S122 from the first integration value S121 to acquire the current difference integration value S12 (=S121−S122).

Step 1840: The CPU applies the current difference integration value S12 to the look-up table Map12Csox(S12) to acquire the exhaust SOx concentration Csox.

Step 1775 in FIG. 17: The CPU sets the SOx concentration acquisition request flag Xsox, the preliminary voltage control end flag Xalt, and the voltage increasing end flag Xup2 to "0", respectively.

When the value of the SOx concentration acquiring request flag Xsox is "0" at a time of executing a process of the step 1510 in FIG. 15, and the engine operation is not in any of the steady operation state and the idling operation state at a time of executing a process of the step 1515 in FIG. 15, the CPU determines "No" at any of the steps 1510 and 1515 and then, executes processes of steps 1550 to 1570 described below. Then, CPU proceeds with the process to the step 1595 to terminate this routine once.

Step 1550: The CPU starts to execute the constant voltage control for controlling the sensor voltage Vss to 0.4 V when the CPU has not executed the constant voltage control. On the other hand, the CPU continues to execute the constant voltage control when the CPU already executes the constant voltage control.

Step 1560: The CPU acquires the sensor current Iss and stores the acquired sensor current Iss as the oxygen concentration current Iss_oxy in the RAM.

Step 1570: The CPU applies the oxygen concentration current Iss_oxy to the look-up table MapCoxy(Iss_oxy) to acquire the exhaust oxygen concentration Coxy.

The first modified apparatus can acquire the exhaust SOx concentration and the exhaust oxygen concentration by executing the routines shown in FIGS. 15 to 17.

Further, the CPU of the ECU 90 of the first modified apparatus is configured or programmed to execute the routine shown in FIG. 11 each time a predetermined time elapses. When the CPU of the first modified apparatus executes the routine shown in FIG. 11, the CPU determines whether the exhaust SOx concentration Csox acquired at the step 1840 in FIG. 18 is larger than the upper limit concentration Cth at the step 1110.

The first modified apparatus can determine whether the exhaust SOx concentration is larger than the upper limit concentration by executing the routine shown in FIG. 11.

It should be noted that the first modified apparatus may be configured to acquire, as the low-voltage current Ilow, the sensor current Iss when the sensor voltage Vss reaches 0.2 V while the first modified apparatus executes the reoxidation voltage decreasing control. In this case, the CPU of the ECU 90 of the first modified apparatus is configured or programmed to execute a routine by a flowchart shown in FIG. 19 each time a predetermined time elapses.

Figure 19:
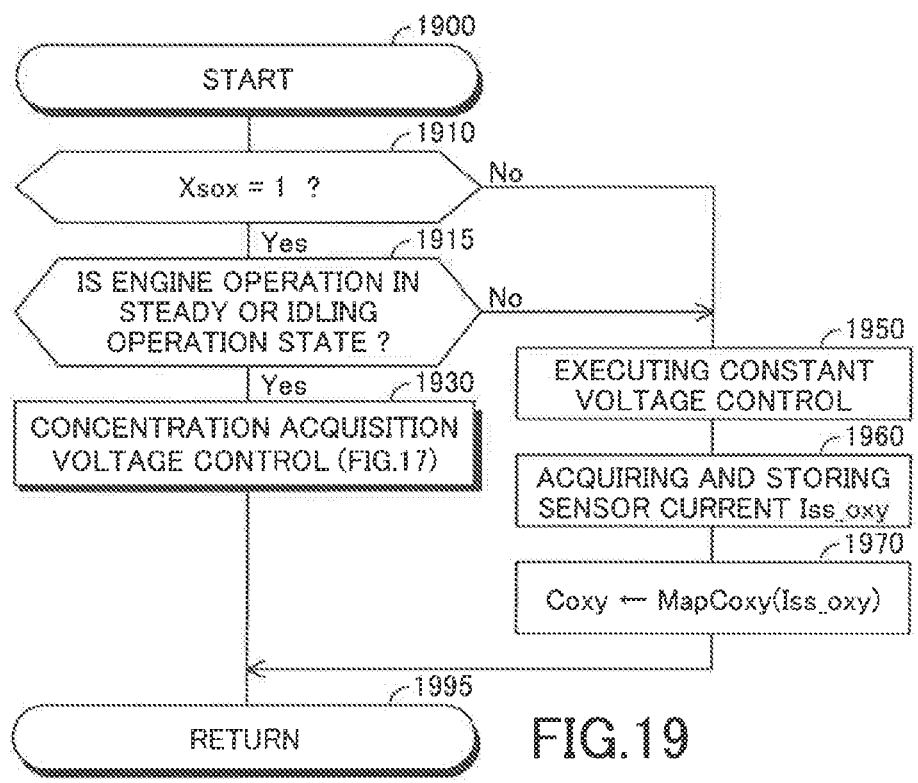
FIG. 19 is a view for showing a flowchart illustrating a routine executed by the CPU of the modified example.

Therefore, at a predetermined timing, the CPU of the first modified apparatus starts a process from a step 1900 in FIG. 19. Processes of steps 1910, 1915, and 1950 to 1970 in FIG. 19 are the same as the processes of the steps 1510, 1515, and 1550 to 1570 in FIG. 15, respectively.

When the CPU determines "Yes" at the step 1915, the CPU proceeds with the process to a step 1930 to execute routine shown in FIG. 17. In this case, the process of setting the value of the preliminary voltage control end flag Xalt to "0" is omitted at the step 1775 in FIG. 17.

Figure 18:
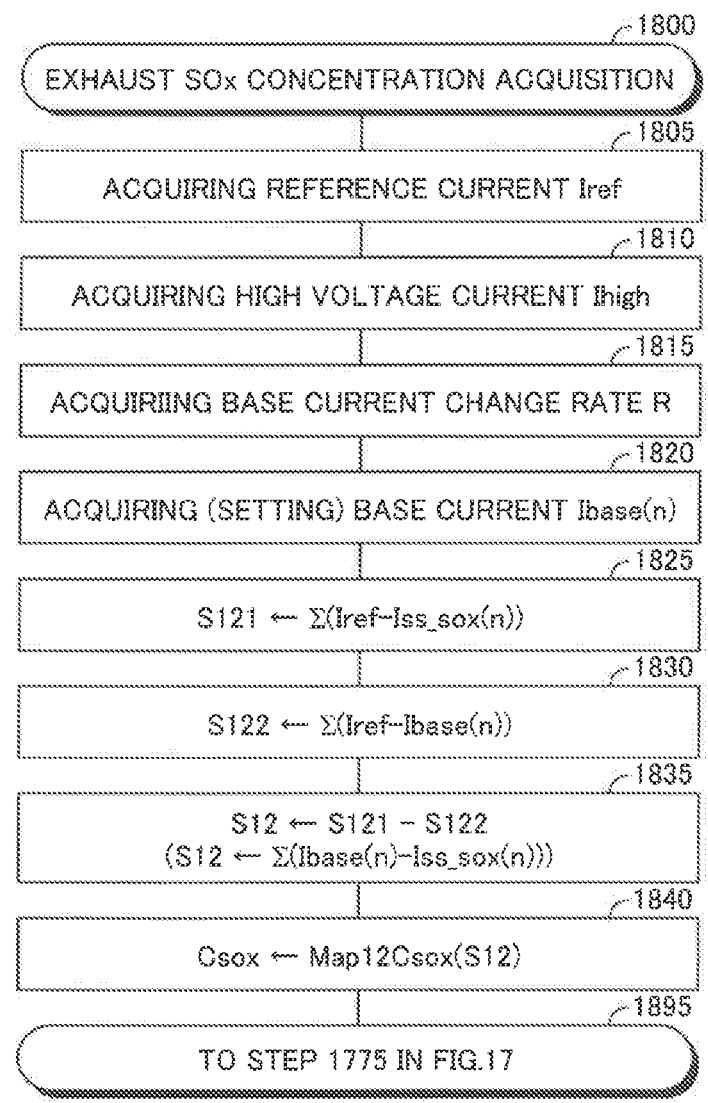
FIG. 18 is a view for showing a flowchart illustrating a routine executed by the CPU of the modified example.
Figure 20:
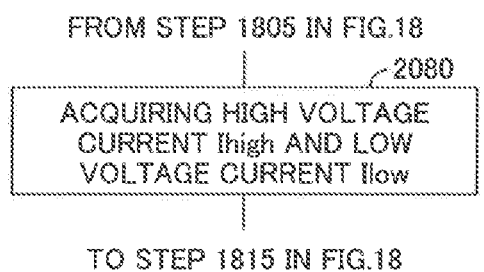
FIG. 20 is a view for showing a flowchart illustrating a routine executed by the CPU of the modified example.

Further, when the CPU of the first modified apparatus executes the routine shown in FIG. 18 at the step 1750 in FIG. 17, the CPU of the first modified apparatus executes a process of a step 2080 shown in FIG. 20 in place of the process of the step 1810. The CPU of the first modified apparatus acquires the SOx concentration current Iss_sox (1), which is acquired when the sensor voltage Vss reaches 0.6 V (i.e., the oxygen decreasing voltage Vox_de), from the SOx concentration currents Iss_sox(n) as the high-voltage current Ihigh at the step 2080. In addition, the CPU of the first modified apparatus acquires the SOx concentration current Iss_sox(n), which is acquired when the sensor voltage Vss reaches 0.2 V (i.e., the voltage decreasing end voltage Vdown_end), from the SOx concentration currents Iss_sox(n) as the low-voltage current Ilow at the step 2080.

Second Embodiment

Figure 21:
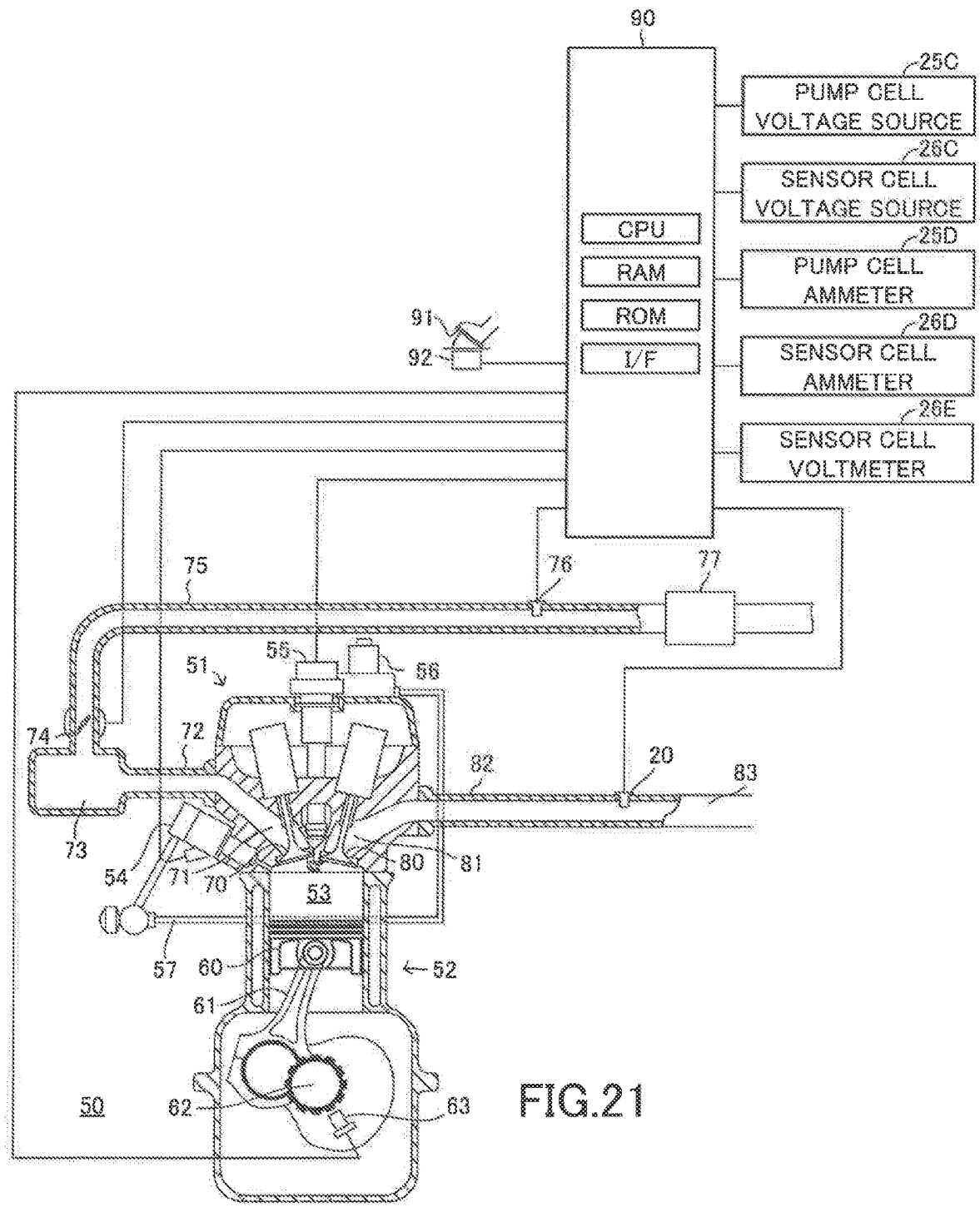
FIG. 21 is a view for showing the internal combustion engine provided with the SOx concentration acquiring apparatus according to a second embodiment of the invention.

Next, the SOx concentration acquiring apparatus of the internal combustion engine according to a second embodiment of the invention will be described. The SOx concentration acquiring apparatus according to the second embodiment of the invention is applied to the internal combustion engine 50 shown in FIG. 21. The internal combustion engine 50 shown in FIG. 21 is the same as the internal combustion engine 50 shown in FIG. 1. Hereinafter, the SOx concentration acquiring apparatus according to the second embodiment will be referred to as "the second embodiment apparatus".

Figure 22:
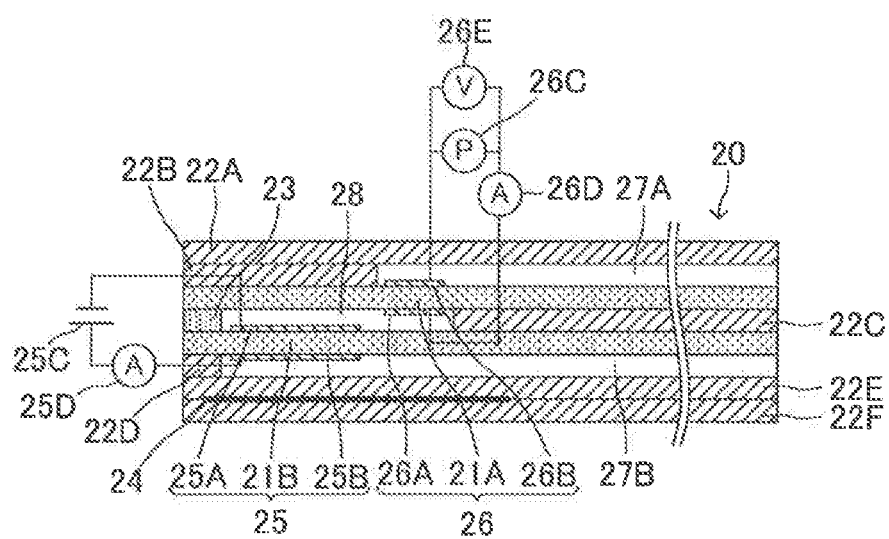
FIG. 22 is a view for showing an inner configuration of a limiting current sensor of the SOx concentration acquiring apparatus according to the second embodiment.

The second embodiment apparatus includes a limiting current sensor 20 having an inner configuration shown in FIG. 22, a pump cell voltage source 25C, a sensor cell voltage source 26C, a pump cell ammeter 25D, a sensor cell ammeter 26D, a sensor cell voltmeter 26E, and the ECU 90. The sensor 20 is a two-cell type limiting current sensor. The sensor 20 is provided on the exhaust pipe 83.

As shown in FIG. 22, the sensor 20 includes a first solid electrolyte layer 21A, a second solid electrolyte layer 21B, a first alumina layer 22A, a second alumina layer 22B, a third alumina layer 22C, a fourth alumina layer 22D, a fifth alumina layer 22E, a sixth alumina layer 22F, a diffusion-limited layer 23, a heater 24, a pump cell 25, a first pump electrode 25A, a second pump electrode 25B, a sensor cell 26, a first sensor electrode 26A, a second sensor electrode 26B, a first atmospheric air introduction passage 27A, a second atmospheric air introduction passage 27B, and an interior space 28.

Each of the solid electrolyte layers 21A and 21B is a layer formed of zirconia or the like and has the oxygen ion conductive property. The alumina layers 22A to 22F are layers formed of alumina, respectively. The diffusion-limited layer 23 is a porous layer, through which the exhaust gas can flow. In the sensor 20, the layers are laminated such that the sixth alumina layer 22F, the fifth alumina layer 22E, the fourth alumina layer 22D, the second solid electrolyte layer 21B, the diffusion-limited layer 23 and the third alumina layer 22C, the first solid electrolyte layer 21A, the second alumina layer 22B, and the first alumina layer 22A are positioned in order from the lower side of FIG. 22. The heater 24 is positioned between the fifth and sixth alumina layers 22E and 22F.

The first atmospheric air introduction passage 27A is a space defined by the first alumina layer 22A, the second alumina layer 22B, and the first solid electrolyte layer 21A, and a part of the first atmospheric air introduction passage 27A opens to the atmosphere. The second atmospheric air introduction passage 27B is a space defined by the second solid electrolyte layer 21B, the fourth alumina layer 22D, and the fifth alumina layer 22E, and a part of the second atmospheric air introduction passage 27B opens to the atmosphere. The interior space 28 is a space defined by the first solid electrolyte layer 21A, the second solid electrolyte layer 21B, the diffusion-limited layer 23, and the third alumina layer 22C, and a part of the interior space 28 communicates with the outside of the sensor 20 via the diffusion-limited layer 23.

The first and second pump electrodes 25A and 25B are electrodes formed of material having low reducing performance (for example, an alloy of gold and platinum), respectively. The first pump electrode 25A is positioned on one of opposite surfaces of the second solid electrolyte layer 21B (that is, a surface of the second solid electrolyte layer 21B which defines the interior space 28). The second pump electrode 25B is positioned on the other surface of the second solid electrolyte layer 21B (that is, a surface of the second solid electrolyte layer 21B which defines the second atmospheric air introduction passage 27B). The first pump electrode 25A, the second pump electrode 25B, and the second solid electrolyte layer 21B form the pump cell 25.

The exhaust gas discharged from the engine 50 flows into the interior space 28 through the diffusion-limited layer 23. The first pump electrode 25A exposes to the exhaust gas flowing into the interior space 28.

The sensor 20 is configured to be able to apply the direct voltage from the pump cell voltage source 25C to the pump cell 25 (in particular, to the second pump electrode 25B so as to procedure an electric potential difference with respect to the first pump electrode 25A). It should be noted that the first pump electrode 25A is a cathode side electrode, and the second pump electrode 25B is an anode side electrode when the pump cell voltage source 25C applies the direct voltage to the pump cell 25.

When the voltage is applied to the pump cell 25, and the oxygen in the interior space 28 contacts the first pump electrode 25A, the oxygen becomes the oxygen ion on the first pump electrode 25A and then, the oxygen ion moves toward the second pump electrode 25B through the second solid electrolyte layer 21B. At this time, the electric current proportional to the amount of the oxygen ion, which has moved through the second solid electrolyte layer 21B, flows between the first and second pump electrodes 25A and 25B. Then, when the oxygen ion reaches the second pump electrode 25B, the oxygen ion becomes the oxygen on the second pump electrode 25B and then, is discharged to the second atmospheric air introduction passage 27B. Therefore, the pump cell 25 can discharge the oxygen from the exhaust gas to the atmosphere by a pumping function, thereby decreasing the oxygen concentration in the interior space 28. An ability of the pumping function of the pump cell 25 increases as the voltage applied to the pump cell 25 from the pump cell voltage source 25C increases.

The first and second sensor electrodes 26A and 26B are electrodes formed of material having high reducing performance (for example, platinum group element such as platinum and rhodium or alloy of the platinum group element). The first sensor electrode 26A is positioned on one of opposite surfaces of the first solid electrolyte layer 21A (that is, a surface of the first solid electrolyte layer 21A which defines the interior space 28). The second sensor electrode 26B is positioned on the other surface of the first solid electrolyte layer 21A (that is, a surface of the first solid electrolyte layer 21A which defines the first atmospheric air introduction passage 27A). The first sensor electrode 26A, the second sensor electrode 26B, and the first solid electrolyte layer 21A form the sensor cell 26.

The first sensor electrode 26A exposes to the exhaust gas flowing into the interior space 28 through the diffusion-limited layer 23.

The sensor 20 is configured to be able to apply the voltage from the sensor cell voltage source 26C to the sensor cell 26 (in particular, to the second sensor electrode 26B so as to produce an electric potential difference with respect to the first sensor electrode 26A). The sensor cell voltage source 26C is configured to apply the direct voltage to the sensor cell 26. It should be noted that the first sensor electrode 26A is a cathode side electrode, and the second sensor electrode 26B is an anode side electrode when the sensor cell voltage source 26C applies the direct voltage to the sensor cell 26.

When the voltage is applied to the sensor cell 26, and the SOx in the interior space 28 contacts the first sensor electrode 26A, the SOx decomposes on the first sensor electrode 26A, the oxygen component of the SOx becomes the oxygen ion and then, the oxygen ion moves toward the second sensor electrode 26B through the first solid electrolyte layer 21A. At this time, the electric current proportional to the amount of the oxygen ion, which has moved through the first solid electrolyte layer 21A, flows between the first and second sensor electrodes 26A and 26B. When the oxygen ion reaches the second sensor electrode 26B, the oxygen ion becomes the oxygen on the second sensor electrode 26B and then, is discharged to the atmospheric air introduction passage 27A.

The heater 24, the pump cell voltage source 25C, the sensor cell voltage source 26C, the pump cell ammeter 25D, the sensor cell ammeter 26D, and the sensor cell voltmeter 26E are electrically connected to the ECU 90.

The ECU 90 controls an activation of the heater 24 to maintain a temperature of the sensor cell 26 at the sensor activating temperature, at which the sensor 20 is activated.

In addition, the ECU 90 controls the voltage of the pump cell voltage source 25C to apply the voltage set as described later to the pump cell 25 from the pump cell voltage source 25C.

In addition, the ECU 90 controls the voltage of the sensor cell voltage source 26C to apply the voltage set as described later to the sensor cell 26 from the sensor cell voltage source 26C.

The pump cell ammeter 25D detects a current Ipp flowing through a circuit including the pump cell 25 and outputs a signal representing the detected current Ipp to the ECU 90. The ECU 90 acquires the current Ipp on the basis of the signal. Hereinafter, the current Ipp will be referred to as "the pump current Ipp".

The sensor cell ammeter 26D detects a current Iss flowing through a circuit including the sensor cell 26 and outputs a signal representing the detected current Iss to the ECU 90. The ECU 90 acquires the current Iss on the basis of the signal. Hereinafter, the current Iss will be referred to as "the sensor current Iss".

The sensor cell voltmeter 26E detects a voltage Vss applied to the sensor cell 26 and outputs a signal representing the detected voltage Vss to the ECU 90. The ECU 90 acquires the voltage Vss on the basis of the signal. Hereinafter, the voltage Vss will be referred to as "the sensor voltage Vss".

Summary of Operation of Second Embodiment Apparatus

<Acquisition of Exhaust SOx Concentration>

Similar to the sensor 10, the inventors of this application have a following knowledge about the exhaust SOx concentration in the sensor 20. The inventors increased the sensor voltage Vss from 0.4 V to 0.8 V and then, decreases the sensor voltage Vss from 0.8 V to 0.2 V with the voltage Vpp capable of reducing the oxygen concentration in the interior space 28 to zero (or generally zero) being applied to the pump cell 25. The inventors acquired the sensor current Iss as a base current Ibase when the sensor voltage Vss reached the oxygen decreasing voltage Vox_de after the sensor voltage Vss started to decrease. In addition, the inventors acquired the sensor currents Iss(1) to Iss(m) after the sensor voltage Vss reached the oxygen decreasing voltage Vox_de. The inventors acquired an integration value S21 of differences dIss(n) (=Ibase−Iss(n)) between the base current Ibase and each of the sensor currents Iss(n) which are the sensor currents Iss(1) to Iss(m) acquired while the sensor voltage Vss decreases after the sensor voltage Vss reaches the oxygen decreasing voltage Vox_de. In this case, the exhaust SOx concentration increases as the integration value S21 increases.

Accordingly, the second embodiment apparatus executes a constant voltage control for controlling the sensor voltage Vss to maintain the sensor voltage Vss at 0.4 V with the voltage Vpp capable of reducing the oxygen concentration in the interior space 28 to zero (or generally zero) being applied to the pump cell 25 when the exhaust SOx concentration is not requested to be acquired.

When the exhaust SOx concentration is requested to be acquired, and the engine operation is in the steady operation state or the idling operation state, the second embodiment apparatus executes the above-described concentration acquisition voltage control.

The second embodiment apparatus acquires the sensor current Iss as the base current Ibase when the sensor voltage Vss reaches the oxygen decreasing voltage Vox_de (in this embodiment, 0.6 V) while the second embodiment apparatus executes the concentration acquisition voltage control. Further, the second embodiment apparatus acquires the sensor current Iss as the SOx concentration current Iss_sox(n) each time the sensor voltage Vss decreases by a predetermined value while the second embodiment apparatus decreases the sensor voltage Vss from 0.6 V to the voltage decreasing end voltage Vdown_end (in this embodiment, 0.2 V). In addition, the second embodiment apparatus stores the acquired SOx concentration currents Iss_sox(n) in the RAM in association with the sensor voltage Vss(n), at which the SOx concentration currents Iss_sox(n) are acquired.

Then, the second embodiment apparatus acquires the differences between the base current Ibase and each of the SOx concentration currents Iss_sox(n) as the current differences dIss(n) (=Ibase−Iss_sox(n)). The second embodiment apparatus acquires the integration value of the current differences dIss(n) as the integration value S21 (=Σ(dIss(n))).

The second embodiment apparatus applies the acquired integration value S21 to a look-up table Map21Csox(S21) to acquire the exhaust SOx concentration Csox. The look-up table Map21Csox(S21) is prepared previously on the basis of experiments, etc. for determining a relationship between the integration value S21 and the exhaust SOx concentration in the sensor 20. The exhaust SOx concentration Csox acquired from the look-up table Map21Csox(S21) increases as the integration value S21 increases. Hereinafter, the integration value S21 will be referred to as "the current difference integration value S21".

The second embodiment apparatus starts to execute the constant voltage control for increasing the sensor voltage Vss from 0.2 V to 0.4 V and maintaining the sensor voltage Vss at 0.4 V after the second embodiment apparatus stops executing the concentration acquisition voltage control.

The second embodiment apparatus acquires the exhaust SOx concentration Csox, using the current difference integration value S21. The current difference integration value S21 is a value correlating with the exhaust SOx concentration. Therefore, the second embodiment apparatus can acquire the exhaust SOx concentration.

Further, (1) the base current Ibase and the SOx concentration current Iss_sox(n) used for acquiring the current difference integration value S21 are currents subject to the oxidizing reaction of the sulfur component derived from the SOx, (2) the current difference dIss used for acquiring the current difference integration value S21 is a value which includes no or almost no component of the sensor current Iss not subject to the oxidizing reaction of the sulfur component, (3) the current difference integration value S21 is a value acquired using the SOx concentration currents Iss_sox(n).

Therefore, a change of the current difference integration value S21 when the exhaust SOx concentration changes, is larger than a change of the difference between the base current Ibase and the SOx concentration current Iss_sox when the exhaust SOx concentration changes in case that the sensor current not subject to the oxidizing reaction of the sulfur component is used as the base current Ibase. Thus, the current difference integration value S21 represents the change of the exhaust SOx concentration definitely. The second embodiment apparatus acquires the exhaust SOx concentration Csox, using the current difference integration value S21. Thus, the second embodiment apparatus can acquire the exhaust SOx concentration accurately.

The second embodiment apparatus applies the voltage Vpp capable of decreasing the oxygen concentration in the interior space 28 to zero (or generally zero) to the pump cell 25 when the second embodiment apparatus executes the preliminary voltage control and the concentration acquisition voltage control. Thus, the oxygen concentration of the exhaust gas reaching the first sensor electrode 26A is generally constant even when the state of the engine operation changes while the second embodiment apparatus executes the preliminary voltage control and the concentration acquisition voltage control. Therefore, the second embodiment apparatus may be configured to execute the preliminary voltage control and the concentration acquisition voltage control and acquire the exhaust SOx concentration Csox even when the engine operation is not in any of the steady operation state and the idling operation state after the exhaust SOx concentration is requested to be acquired.

<Acquisition of Exhaust NOx Concentration>

When the exhaust gas includes nitrogen oxide (hereinafter, will be referred to as "NOx"), the NOx is reduced by the sensor cell 26 with the sensor voltage Vss being maintained at 0.4 V and decomposes to nitrogen and the oxygen. The oxygen produced by the NOx decomposing, becomes the oxygen ion at the sensor cell 26. The oxygen ion moves toward the second sensor electrode 26B through the first solid electrolyte layer 21A.

Even when the voltage Vpp capable of reducing the oxygen concentration in the interior space 28 to zero or generally zero, is applied to the pump cell 25, the NOx included in the exhaust gas is unlikely to be reduced at the pump cell 25 since the first and second pump electrodes 25A and 25B forming the pump cell 25 are made of the material having the low reduction property. In addition, when the voltage Vpp capable of reducing the oxygen concentration in the interior space 28 to zero or generally zero, is applied to the pump cell 25, almost no oxygen is included in the exhaust gas reaching the sensor cell 26.

Figure 23:
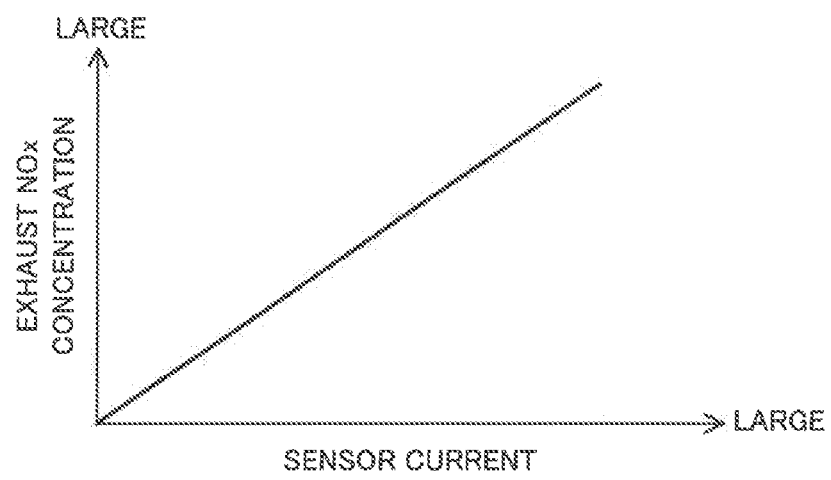
FIG. 23 is a view for showing a relationship between the current flowing through the sensor cell of the sensor of the SOx concentration acquiring apparatus according to the second embodiment and a NOx concentration of the exhaust gas just discharged from the internal combustion engine.

Therefore, when the voltage Vpp capable of reducing the oxygen concentration in the interior space 28 to zero or generally zero, is applied to the pump cell 25, and the sensor voltage Vss is maintained at 0.4 V, the sensor current Iss output in proportion to the amount of the oxygen ion moving through the first solid electrolyte layer 21A, is proportional to a concentration of the NOx included in the exhaust gas just discharged from the engine 50. Hereinafter, the concentration of the NOx will be referred to as "the NOx concentration", and the concentration of the NOx included in the exhaust gas just discharged from the engine 50 will be referred to as "the exhaust NOx concentration". There is a relationship shown in FIG. 23 between the sensor current Iss and the exhaust NOx concentration. Therefore, the exhaust NOx concentration can be acquired by using the sensor current Iss.

Accordingly, the second embodiment apparatus executes a pump voltage control for applying the voltage Vpp capable of reducing the oxygen concentration in the interior space 28 to zero or generally zero to the pump cell 25 and the constant voltage control for controlling the sensor voltage Vss to 0.4 V. The second embodiment apparatus acquires the sensor current Iss as a NOx concentration current Iss_nox while the second embodiment apparatus executes the pump voltage control and the constant voltage control. Then, the second embodiment apparatus applies the NOx concentration current Iss_nox to a look-up table MapCnox(Iss_nox), thereby acquiring the exhaust NOx concentration Cnox. The look-up table MapCnox(Iss_nox) is prepared previously on the basis of experiments, etc. for determining a relationship between the sensor current Iss and the exhaust NOx concentration in the sensor 20. The exhaust NOx concentration Cnox acquired from the look-up table MapCnox(Iss_nox) increases as the NOx concentration current Iss_nox increases.

<Acquisition of Exhaust Oxygen Concentration>

There is a relationship as shown in FIG. 3 between the voltage Vpp applied to the pump cell 25 from the pump cell voltage source 25C and the pump current Ipp. Accordingly, the second embodiment apparatus executes the pump voltage control for applying the voltage Vpp capable of reducing the oxygen concentration in the interior space 28 to zero or generally zero to the pump cell 25. The second embodiment apparatus acquires the pump current Ipp as an oxygen concentration current Ipp_oxy while the second embodiment apparatus executes the pump voltage control. Then, the second embodiment apparatus applies the oxygen concentration current Ipp_oxy to a look-up table MapCoxy(Ipp_oxy), thereby acquiring the exhaust oxygen concentration Coxy. The look-up table MapCoxy(Ipp_oxy) is prepared previously on the basis of experiments, etc. for determining a relationship between the pump current Ipp and the exhaust oxygen concentration in the sensor 20. The exhaust oxygen concentration Coxy acquired from the look-up table MapCoxy(Ipp_oxy) increases as the oxygen concentration current Ipp_oxy increases. Hereinafter, the voltage Vpp applied to the pump cell 25 from the pump cell voltage source 25C will be referred to as "the pump voltage Vpp".

Thereby, the second embodiment apparatus can acquire the exhaust oxygen concentration as well as the exhaust SOx concentration and the exhaust NOx concentration.

It should be noted that a relationship between the sensor voltage Vss and the sensor current Iss is the same as the relationship shown in FIG. 3. Therefore, the second embodiment apparatus may be configured to acquire the sensor current Iss as the oxygen concentration current Iss_oxy while the second embodiment apparatus controls the sensor voltage Vss to 0.4 V and the pump voltage Vpp to 0 V and apply the oxygen concentration current Iss_oxy to a look-up table MapCoxy(Iss_oxy), thereby acquiring the exhaust oxygen concentration Coxy. The exhaust oxygen concentration Coxy acquired from the look-up table MapCoxy(Iss_oxy) increases as the oxygen concentration current Iss_oxy increases.

Concrete Operation of Second Embodiment Apparatus

Next, a concrete operation of the second embodiment apparatus will be described. Similar to the first embodiment apparatus, the CPU of the ECU 90 of the second embodiment apparatus is configured or programmed to execute the routines shown in FIGS. 9 and 11 each time the predetermined time elapses.

Therefore, the second embodiment apparatus executes the routine shown in FIG. 10 at the step 960 in FIG. 9. In this case, the CPU of the second embodiment apparatus acquires the current difference integration value S21 at the step 1030 in FIG. 10 and applies the current difference integration value S21 to the look-up table Map21Csox(S21) to acquire the exhaust SOx concentration Csox.

Figure 24:
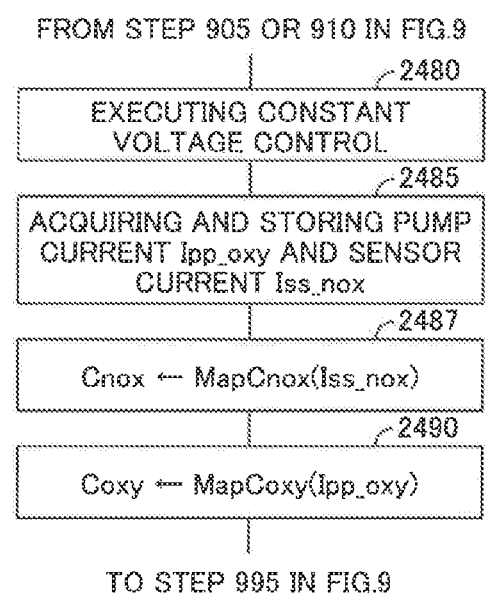
FIG. 24 is a view for showing a flowchart illustrating a routine executed by the CPU of the ECU of the SOx concentration acquiring apparatus according to the second embodiment.

Further, the CPU of the second embodiment apparatus executes processes of steps 2480 to 2490 shown in FIG. 24 in place of executing the processes of the steps 980 to 990 shown in FIG. 9.

When the value of the SOx concentration acquiring request flag Xsox is "0" at the time of executing the process of the step 905 in FIG. 9, the CPU of the second embodiment apparatus determines "No" at the step 905 and then, executes the processes of the steps 2480 to 2490 in FIG. 24 described below. Also, when the engine operation is not in any of the steady operation state and the idling operation state at the time of executing the process of the step 910 in FIG. 9, the CPU of the second embodiment apparatus determines "No" at the step 910 and then, executes the processes of the steps 2480 to 2490 in FIG. 24 described below. Then, the CPU of the second embodiment apparatus proceeds with the process to the step 995 in FIG. 9 to terminate this routine once.

Step 2480: The CPU of the second embodiment apparatus starts to execute the constant voltage control for controlling the sensor voltage Vss to 0.4 V when the CPU has not executed the constant voltage control. On the other hand, the CPU of the second embodiment apparatus continues to execute the constant voltage control when the CPU already executes the constant voltage control.

Step 2485: The CPU of the second embodiment apparatus acquires the pump current Ipp as the oxygen concentration current Ipp_oxy and the sensor current Iss as the NOx concentration current Iss_nox.

Step 2487: The CPU of the second embodiment apparatus applies the NOx concentration current Iss_nox to the look-up table MapCnox(Iss_nox) to acquire the exhaust NOx concentration Cnox.

Step 2490: The CPU of the second embodiment apparatus applies the oxygen concentration current Ipp_oxy to the look-up table MapCoxy(Ipp_oxy) to acquire the exhaust oxygen concentration Coxy.

It should be noted that the CPU of the second embodiment apparatus controls the pump cell voltage source 25C such that the pump voltage Vpp capable of reducing the oxygen concentration of the exhaust gas in the interior space 28 to zero or generally zero, is applied to the pump cell 25 while the second embodiment apparatus executes the routine shown in FIG. 9.

The second embodiment apparatus can acquire the exhaust SOx concentration, the exhaust NOx concentration, and the exhaust oxygen concentration by executing the routine shown in FIG. 9. In addition, the second embodiment apparatus can determine that the exhaust SOx concentration is larger than the upper limit concentration Cth by executing the routine shown in FIG. 11.

Modified Example of Second Embodiment

Next, the SOx concentration acquiring apparatus of the internal combustion engine according to a modified example of the second embodiment will be described. Hereinafter, the SOx concentration acquiring apparatus according to the modified example of the second embodiment will be referred to as "the second modified apparatus".

<Summary of Operation of Second Modified Apparatus>

Similar to the sensor 10, in the sensor 20, an integration value S22, which increases as the exhaust SOx concentration increases, can be acquired by acquiring the change rate of the sensor current Iss as the base current change rate R while the sensor voltage Vss changes from the high-voltage current Ihigh to the low-voltage current Ilow, acquiring currents at the sensor voltages Vss(n), at which the SOx concentration currents Iss_sox(n) are acquired, as the base currents Ibase(n), from currents changing from the high-voltage current Ihigh at the base current change rate R, acquiring differences between each of the base currents Ibase(n) and each of the SOx concentration currents Iss_sox(n) as the current differences dIss(n), and acquiring the integration value S22 of the current differences dIss(n).

Accordingly, the second modified apparatus acquires the exhaust SOx concentration Csox by executing processes similar to the processes executed by the first modified apparatus. The second modified apparatus executes the preliminary voltage control when the exhaust SOx concentration is requested to be acquired, and the engine operation is in any of the steady operation state and the idling operation state. The second modified apparatus acquires the low-voltage current Ilow while the second modified apparatus executes the preliminary voltage control.

The second modified apparatus acquires the sensor current Iss as the SOx concentration current Iss_sox(n) each time the sensor voltage Vss decreases by a predetermined value while the second modified apparatus decreases the sensor voltage Vss from 0.6 V to 0.2 V after the second modified apparatus stops executing the preliminary voltage control. In addition, the second modified apparatus stores the acquired SOx concentration currents Iss_sox(n) in the RAM in association with the sensor voltage Vss(n), at which the SOx concentration currents Iss_sox(n) are acquired.

Then, the second modified apparatus acquires an integration value of differences between the reference current Iref and each of the SOx concentration currents Iss_sox(n) as a first integration value S221 (=Σ(Iref−Iss_sox(n))).

Further, the second modified apparatus acquires the sensor current Iss as the high-voltage current Ihigh when the sensor voltage Vss reaches the oxygen decreasing voltage Vox_de (in this example, 0.6 V) while the second modified apparatus executes the reoxidation voltage decreasing control.

The second modified apparatus acquires the average change rate of the sensor current Iss changing from the high-voltage current Ihigh to the low-voltage current Ilow as the base current change rate R. In addition, the second modified apparatus acquires the currents at the sensor voltages Vss(n), at which the SOx concentration currents Iss_sox(n) are acquired, as the base currents Ibase(n) from the currents changing from the high-voltage current Ihigh at the base current change rate R.

The second modified apparatus acquires an integration value of differences between the reference current Iref and each of the base currents Ibase(n) as a second integration value S222 (=Σ(Iref−Iss_sox(n)))

The second modified apparatus subtracts the second integration value S222 from the first integration value S221, thereby acquiring a current difference integration value S22 (=S221−S222).

In other words, the second modified apparatus acquires the differences between each of the base currents Ibase(n) and each of the SOx concentration currents Iss_sox(n) as the current differences dIss(n) by the above-described method. In addition, the second modified apparatus acquires the integration value of the current differences dIss(n) as the current difference integration value S22.

The second modified apparatus applies the current difference integration value S22 to a look-up table Map22Csox(S22) to acquire the exhaust SOx concentration Csox. The look-up table Map22Csox(S22) is prepared previously on the basis of experiments, etc. for determining a relationship between the current difference integration value S22 and the exhaust SOx concentration in the sensor 20. The exhaust SOx concentration Csox acquired from the look-up table Map22Csox(S22) increases as the current difference integration value S22 increases.

The second modified apparatus acquires the exhaust SOx concentration Csox, using the current difference integration value S22. The current difference integration value S22 is a value correlating with the SOx concentration of the exhaust gas reaching the first sensor electrode 26A. Therefore, the exhaust SOx concentration can be acquired.

Further, the base current change rate R is a value near the change rate of the sensor current Iss changing after the sensor voltage Vss reaches the oxygen decreasing voltage Vox_de while the exhaust SOx concentration is zero. Therefore, the differences between each of the base currents Ibase(n) and each of the SOx concentration currents Iss_sox(n) are value in which components of the sensor current Iss not subject to the oxidizing reaction of the sulfur component are eliminated more or substantially since the currents acquired on the basis of the base current change rate R is used as the base currents Ibase(n). Thus, the change rate of the current difference integration value S22 is larger than the change rate of the difference between the base current and the SOx concentration current Iss_sox acquired, using the current not subject to the oxidizing reaction of the sulfur component as the base current when the exhaust SOx concentration changes. Therefore, the current difference integration value S22 represents the change of the exhaust SOx concentration definitely. Thus, the exhaust SOx concentration can be acquired more accurately.

<Concrete Operation of Second Modified Apparatus>

Next, a concrete operation of the second modified apparatus will be described. The CPU of the ECU 90 of the second modified apparatus is configured or programmed to execute the routines shown in FIGS. 15 and 11 each time the predetermined time elapses.

When the CPU of the second modified apparatus executes the routine shown in FIG. 15, the CPU of the second modified apparatus executes the routine shown in FIG. 17 at the step 1540 in FIG. 15 and executes the routine shown in FIG. 18 at the step 1750 in FIG. 17. The CPU of the second modified apparatus acquires the current difference integration value S22 at the step 1835 in FIG. 18. The CPU of the second modified apparatus applies the current difference integration value S22 to the look-up table Map22Csox(S22) to acquire the exhaust SOx concentration Csox at the step 1840 in FIG. 18.

Further, the CPU of the second modified apparatus executes the processes of the steps 2480 to 2490 in FIG. 24 in place of the processes of the steps 1550 to 1570 in FIG. 15.

The CPU of the second modified apparatus also controls the pump cell voltage source 25C such that the pump voltage Vpp capable of reducing the oxygen concentration of the exhaust gas in the interior space 28 to zero or generally zero is applied to the pump cell 25 while the CPU of the second modified apparatus executes the routine shown in FIG. 15.

The CPU of the second modified apparatus can acquire the exhaust SOx concentration Csox, the exhaust NOx concentration Cnox, and the exhaust oxygen concentration Coxy by executing the routine shown in FIG. 15. Further, the second modified apparatus can determine that the exhaust SOx concentration is larger than the upper limit concentration by executing the routine shown in FIG. 11.

It should be noted that the present invention is not limited to the aforementioned embodiment and various modifications can be employed within the scope of the present invention.

What is claimed is:

1. A SOx concentration acquiring apparatus of an internal combustion engine, comprising:
a sensor cell formed by a solid electrolyte layer, a first sensor electrode provided on one of opposite surfaces of the solid electrolyte layer such that the first sensor electrode is exposed to an exhaust gas discharged from the internal combustion engine, and a second sensor electrode provided on the other surface of the opposite surfaces of the solid electrolyte layer; and
an electronic control unit for controlling a sensor voltage which is a voltage applied to the sensor cell and acquiring a sensor current which is a current flowing through the sensor cell,
wherein the electronic control unit is configured to:
execute a decomposition voltage increasing control for increasing the sensor voltage from a first voltage lower than an oxygen increasing voltage to a second voltage equal to or higher than the oxygen increasing voltage, the oxygen increasing voltage being a voltage at which an amount of oxygen component produced by SOx decomposing to sulfur component and the oxygen component is larger than the amount of the oxygen component consumed by the sulfur component being oxidized by the oxygen component to the SOx;
execute a reoxidation voltage decreasing control for decreasing the sensor voltage from the second voltage to a third voltage lower than an oxygen decreasing voltage after the electronic control unit executes the decomposition voltage increasing control, the oxygen decreasing voltage being a voltage at which the amount of the oxygen component consumed by the sulfur component being oxidized by the oxygen component to the SOx is larger than the amount of the oxygen component produced by the SOx decomposing to the sulfur component and the oxygen component;

acquire the sensor currents as SOx concentration currents, respectively after the sensor voltage reaches the oxygen decreasing voltage while the electronic control unit executes the reoxidation voltage decreasing control, wherein the sensor voltage is continuously decreased while acquiring the SOx concentration currents during the reoxidation voltage decreasing control;

acquire the sensor current as a high-voltage current when the sensor voltage decreases to a fourth voltage equal to or lower than the oxygen decreasing voltage;

acquire the sensor current as a low-voltage current when the sensor voltage decreases to a fifth voltage lower than the fourth voltage;

acquire a change rate of the sensor current as a sensor current change rate while the sensor current changes from the high-voltage current to the low-voltage current;

acquire currents which change from the high-voltage current at the sensor current change rate and correspond to the sensor voltages, at which the electronic control unit acquires the SOx concentration currents, as base currents, respectively;

acquire an integration value of differences between each of the base currents and each of the SOx concentration currents; and acquire a SOx concentration of the exhaust gas on the basis of the integration value.

2. The SOx concentration acquiring apparatus as set forth in claim 1, wherein the electronic control unit is further configured to set the oxygen decreasing voltage as the fourth voltage.

3. The SOx concentration acquiring apparatus as set forth in claim 1, wherein the electronic control unit is further configured to:
execute a preliminary voltage increasing control for increasing the sensor voltage to a sixth voltage lower than the fourth voltage and the oxygen decreasing voltage;
execute a preliminary voltage decreasing control for decreasing the sensor voltage from the sixth voltage to a voltage equal to or lower than the fifth voltage after the electronic control unit executes the preliminary voltage increasing control; and
acquire the sensor current as the low-voltage current when the sensor voltage reaches the fifth voltage while the electronic control unit executes the preliminary voltage decreasing control.

4. The SOx concentration acquiring apparatus as set forth in claim 1, wherein the electronic control unit is further configured to acquire the sensor current as the low-voltage current when the sensor voltage reaches the fifth voltage while the electronic control unit executes the reoxidation voltage decreasing control.

5. The SOx concentration acquiring apparatus as set forth in claim 1, wherein the electronic control unit is further configured to set, as the third voltage, the sensor voltage at which all the sulfur component is expected to be reoxidized while the electronic control unit executes the reoxidation voltage decreasing control.

6. The SOx concentration acquiring apparatus as set forth in claim 1, wherein the electronic control unit is further configured to:
execute a constant voltage control for controlling the sensor voltage to a voltage lower than the oxygen increasing voltage before the electronic control unit executes the decomposition voltage increasing control after the electronic control unit executes the reoxidation voltage decreasing control; and
acquire an oxygen concentration of the exhaust gas on the basis of the sensor current acquired while the electronic control unit executes the constant voltage control.

7. The SOx concentration acquiring apparatus as set forth in claim 1, wherein the SOx concentration acquiring apparatus comprises the solid electrolyte layer as a first solid electrolyte layer,
the SOx concentration acquiring apparatus further comprises a pump cell formed by a second solid electrolyte layer, a first pump electrode provided on one of opposite surfaces of the second solid electrolyte layer such that the first pump electrode is exposed to the exhaust gas, and a second pump electrode provided on the other surface of the opposite surfaces of second solid electrolyte layer, and
the electronic control unit is further configured to:
execute a pump voltage control for applying a voltage capable of decreasing an oxygen concentration of the exhaust gas to zero to the pump cell and a constant voltage control for controlling the sensor voltage to a constant voltage lower than the oxygen increasing voltage; and
acquire a NOx concentration of the exhaust gas on the basis of the sensor current acquired while the electronic control unit executes the pump voltage control and the constant voltage control.

8. The SOx concentration acquiring apparatus as set forth in claim 7, wherein the electronic control unit is further configured to acquire the oxygen concentration of the exhaust gas on the basis of a pump current which is a current flowing through the pump cell while the electronic control unit executes the pump voltage control.

9. The SOx concentration acquiring apparatus as set forth in claim 1, wherein the SOx concentration acquiring apparatus further comprises a pump cell formed by the solid electrolyte layer, a first pump electrode provided on the one of the opposite surfaces of the solid electrolyte layer such that the first pump electrode is exposed to the exhaust gas, and a second pump electrode provided on the other surface of the opposite surfaces of the solid electrolyte layer, and
the electronic control unit is further configured to:
execute a pump voltage control for applying a voltage capable of decreasing an oxygen concentration of the exhaust gas to zero to the pump cell and a constant voltage control for controlling the sensor voltage to a constant voltage lower than the oxygen increasing voltage; and
acquire a NOx concentration of the exhaust gas on the basis of the sensor current acquired while the electronic control unit executes the pump voltage control and the constant voltage control.

10. The SOx concentration acquiring apparatus as set forth in claim 9, wherein the electronic control unit is further configured to acquire the oxygen concentration of the exhaust gas on the basis of a pump current which is a current flowing through the pump cell while the electronic control unit executes the pump voltage control.

* * * * *